US012789096B2

(12) United States Patent
Cui

(10) Patent No.: US 12,789,096 B2
(45) Date of Patent: Nov. 10, 2026

(54) METHOD AND APPARATUS FOR REQUESTING AND DISCARDING VIRTUAL CONSUMABLE, TERMINAL, AND STORAGE MEDIUM

(71) Applicant: Tencent Technology (Shenzhen) Company Limited, Shenzhen (CN)

(72) Inventor: Weijian Cui, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 186 days.

(21) Appl. No.: 18/751,144

(22) Filed: Jun. 21, 2024

(65) Prior Publication Data

US 2024/0342606 A1 Oct. 17, 2024

Related U.S. Application Data

(63) Continuation of application No. PCT/CN2023/099736, filed on Jun. 12, 2023.

(30) Foreign Application Priority Data

Aug. 18, 2022 (CN) ........................ 202210992626.X

(51) Int. Cl.
*G06Q 30/02* (2023.01)
*A63F 13/56* (2014.01)

(52) U.S. Cl.
CPC .................................... *A63F 13/56* (2014.09)

(58) Field of Classification Search
CPC ........ A63F 13/56; A63F 13/52; A63F 13/533; A63F 13/55; A63F 13/837;
(Continued)

(56) References Cited

U.S. PATENT DOCUMENTS

2013/0059663 A1* 3/2013 Kurlancheek ............. A63F 9/24 463/42
2020/0038755 A1* 2/2020 Kojima ................... A63F 13/57
(Continued)

FOREIGN PATENT DOCUMENTS

CN 110201403 A 9/2019
CN 112516583 A 3/2021
(Continued)

OTHER PUBLICATIONS

"Call to Arms, Introducing the In-Game Interface" (published on Apr. 13, 2018 at https://steamcommunity.com/sharedfiles/filedetails/?id=1354566721) (Year: 2018).*
(Continued)

*Primary Examiner* — James M Detweiler
(74) *Attorney, Agent, or Firm* — ArentFox Schiff LLP

(57) ABSTRACT

In a requesting and discarding a virtual consumable method, a consumable option interface is displayed. A trigger operation on a first consumable option in the consumable option interface is received, and the first consumable option corresponds to a first virtual consumable. Based on the trigger operation, a first virtual object to perform an interaction operation on the first virtual consumable is controlled. The interaction operation includes at least one of a discard operation, a discard and mark operation, or a request operation.

20 Claims, 20 Drawing Sheets

(58) Field of Classification Search
CPC ....... A63F 2300/308; A63F 2300/8076; G06F 3/04842; G06F 3/04847; G06F 3/0486
See application file for complete search history.

(56) References Cited

U.S. PATENT DOCUMENTS

| | | | | |
|---|---|---|---|---|
| 2021/0031106 | A1* | 2/2021 | Alderman | A63F 13/35 |
| 2022/0080308 | A1* | 3/2022 | Fung | A63F 13/426 |

FOREIGN PATENT DOCUMENTS

| | | | | |
|---|---|---|---|---|
| CN | 114159785 | A | 3/2022 | |
| CN | 114404969 | A | 4/2022 | |
| JP | 2022-535635 | A | 8/2022 | |
| WO | WO-2020244415 | A1 * | 12/2020 | A63F 13/55 |

OTHER PUBLICATIONS

Office Action received for Japanese Patent Application No. 2024-561866, mailed on Jul. 25, 2025, 10 pages (5 pages of English Translation and 5 pages of Original Document).
International Search Report and Written Opinion received for PCT Patent Application No. PCT/CN2023/099736, mailed on Sep. 12, 2023, 16 pages (6 pages of English Translation and 10 pages of Original Document).

* cited by examiner

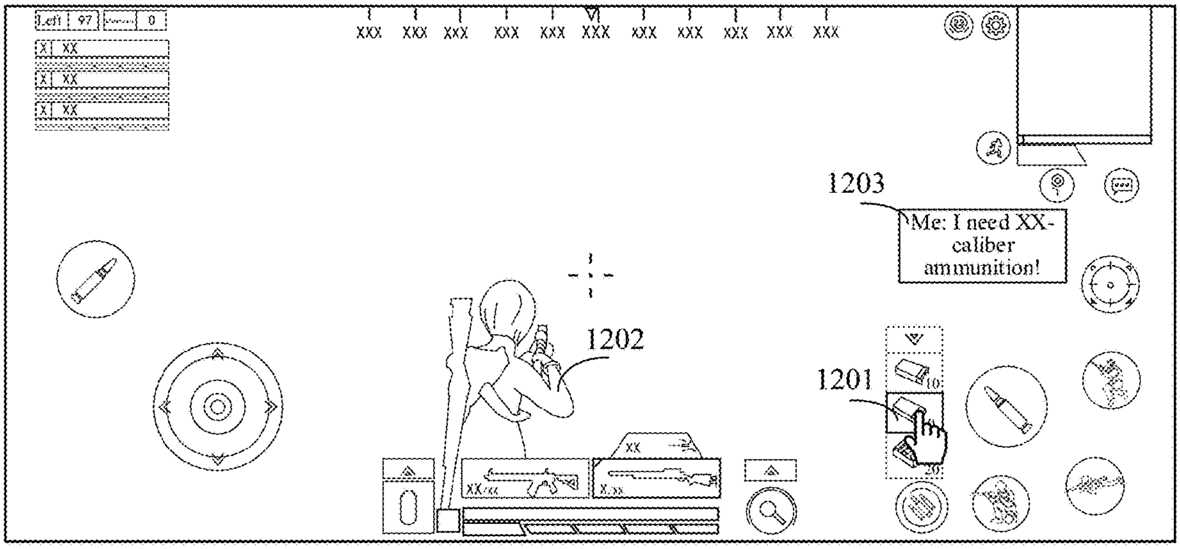

FIG. 12

Display a consumable option bar, where the consumable option bar contains a consumable option corresponding to at least one virtual consumable — 1301

Receive a trigger operation on a first consumable option in the consumable option bar, where the first consumable option corresponds to a first virtual consumable — 1302

Display a quantity setting control, where the quantity setting control is configured to set a quantity of demanded or discarded first virtual consumables — 1303

Determine a first quantity based on a set operation on the quantity setting control — 1304

Control a first virtual object to discard the first quantity of first virtual consumables when an interaction operation is a discard and mark operation; and send a discard and mark message to a second virtual object based on a position of the first virtual consumable — 1305

Control the first virtual object to discard the first quantity of first virtual consumables when the interaction operation is a discard operation — 1306

Control the first virtual object to send a first demand message to the second virtual object when the interaction operation is a demand operation, where the first demand message contains a name and the first quantity of the first virtual consumables — 1307

FIG. 13

METHOD AND APPARATUS FOR REQUESTING AND DISCARDING VIRTUAL CONSUMABLE, TERMINAL, AND STORAGE MEDIUM

RELATED APPLICATIONS

The present application is a continuation of International Application No. PCT/CN2023/099736, filed Jun. 12, 2023, which claims priority to Chinese Patent Application No. 202210992626. X, filed on Aug. 18, 2022. The entire disclosures of the prior applications are hereby incorporated by reference.

FIELD OF THE TECHNOLOGY

This disclosure relates to the field of human-computer interaction technologies, including to a method and an apparatus for requesting and discarding a virtual consumable, a terminal, and a storage medium.

BACKGROUND OF THE DISCLOSURE

A first-person shooting game (FPS) is an application program based on a three-dimensional virtual environment. A user may control a virtual object in the virtual environment to perform actions such as walking, running, climbing, and shooting, and a plurality of users may form an online team to collaboratively complete a task in the same virtual environment.

In the related art, when a virtual object has a requirement of requesting virtual ammunition, the virtual object needs to hold a corresponding virtual prop first, and then send request information through a quick message in a roulette wheel; and when the virtual object has a requirement of discarding the virtual ammunition, the virtual object needs to open an inventory interface first, drag and discard corresponding virtual ammunition, and information corresponding to the virtual ammunition can only be obtained and sent by aiming at the virtual ammunition in the virtual environment and tapping a mark button.

In the related art, when the virtual object requests and discards the virtual ammunition, many previous operations may need to be triggered, which is a complex process.

SUMMARY

This disclosure provides a method, an apparatus, a device, and a non-transitory computer-readable storage medium for requesting and discarding a virtual consumable. Examples of technical solutions are as follows:

According to an aspect this disclosure, a method for requesting and discarding a virtual consumable is provided. In the method, a consumable option interface is displayed. A trigger operation on a first consumable option in the consumable option interface is received, the first consumable option corresponding to a first virtual consumable. Based on the trigger operation, a first virtual object to perform an interaction operation on the first virtual consumable is controlled. The interaction operation includes at least one of (i) a discard operation that is configured to discard the first virtual consumable in a virtual environment, (ii) a discard and mark operation that is configured to discard the first virtual consumable in the virtual environment and mark a position of the first virtual consumable in the virtual environment, or (iii) a request operation that is configured to request the first virtual consumable from a second virtual object.

According to an aspect of this disclosure, an apparatus for requesting and discarding a virtual consumable, including processing circuitry is provided. The processing circuitry is configured to display a consumable option interface. The processing circuitry is configured to receive a trigger operation on a first consumable option in the consumable option interface, the first consumable option corresponding to a first virtual consumable. The processing circuitry is configured to control a first virtual object to perform an interaction operation on the first virtual consumable, the interaction operation comprising at least one of (i) a discard operation that is configured to discard the first virtual consumable in a virtual environment, (ii) a discard and mark operation that is configured to discard the first virtual consumable in the virtual environment and mark a position of the first virtual consumable in the virtual environment, or (iii) a request operation that is configured to request the first virtual consumable from a second virtual object. According to an aspect of this disclosure, a terminal is provided. The terminal includes a processor and a memory, the memory having at least one instruction stored herein, and the at least one instruction being loaded and executed by the processor to implement the method for requesting and discarding a virtual consumable according to the foregoing aspects.

According to an aspect of this disclosure, a non-transitory computer-readable storage medium is provided. The non-transitory computer-readable storage medium storing at least one instruction which when executed by a processor cause the processor to implement the method for requesting and discarding a virtual consumable according to the foregoing aspects.

According to an aspect of this disclosure, a computer program product is provided. The computer program product includes computer instructions, and the computer instructions being stored in a computer-readable storage medium. A processor of a computer device reads the computer instructions from the computer-readable storage medium, and the processor executes the computer instructions, to cause the computer device to perform the method for requesting and discarding a virtual consumable according to the foregoing aspects.

In an example, by using a consumable option interface as an entrance for controlling a first virtual object to perform an interaction operation, a terminal displays a consumable option corresponding to at least one virtual consumable in the consumable option interface, and based on a received trigger operation on a first consumable option in the consumable option interface, controls the first virtual object to perform an interaction operation on a first virtual consumable, where the interaction operation includes at least one of a discard operation, a discard and mark operation, or a request operation. In this way, for example, the consumable option interface is implemented as a unified entrance to control the first virtual object to perform a plurality of interaction operations on the first virtual consumable, simplifying a path for controlling the first virtual object to perform the interaction operation, and improving the execution efficiency of the interaction operation.

BRIEF DESCRIPTION OF THE DRAWINGS

FIG. 12 is a schematic diagram of an interface of controlling a first virtual object to perform a demand operation according to an example aspect of this disclosure.

FIG. 13 is a flowchart of a method for demanding and discarding a virtual consumable according to an example aspect of this disclosure.

DETAILED DESCRIPTION

In order to make the objectives, technical solutions, and advantages of this disclosure clearer, the following describes implementations of this disclosure in further detail with reference to the accompanying drawings.

Figure 1:
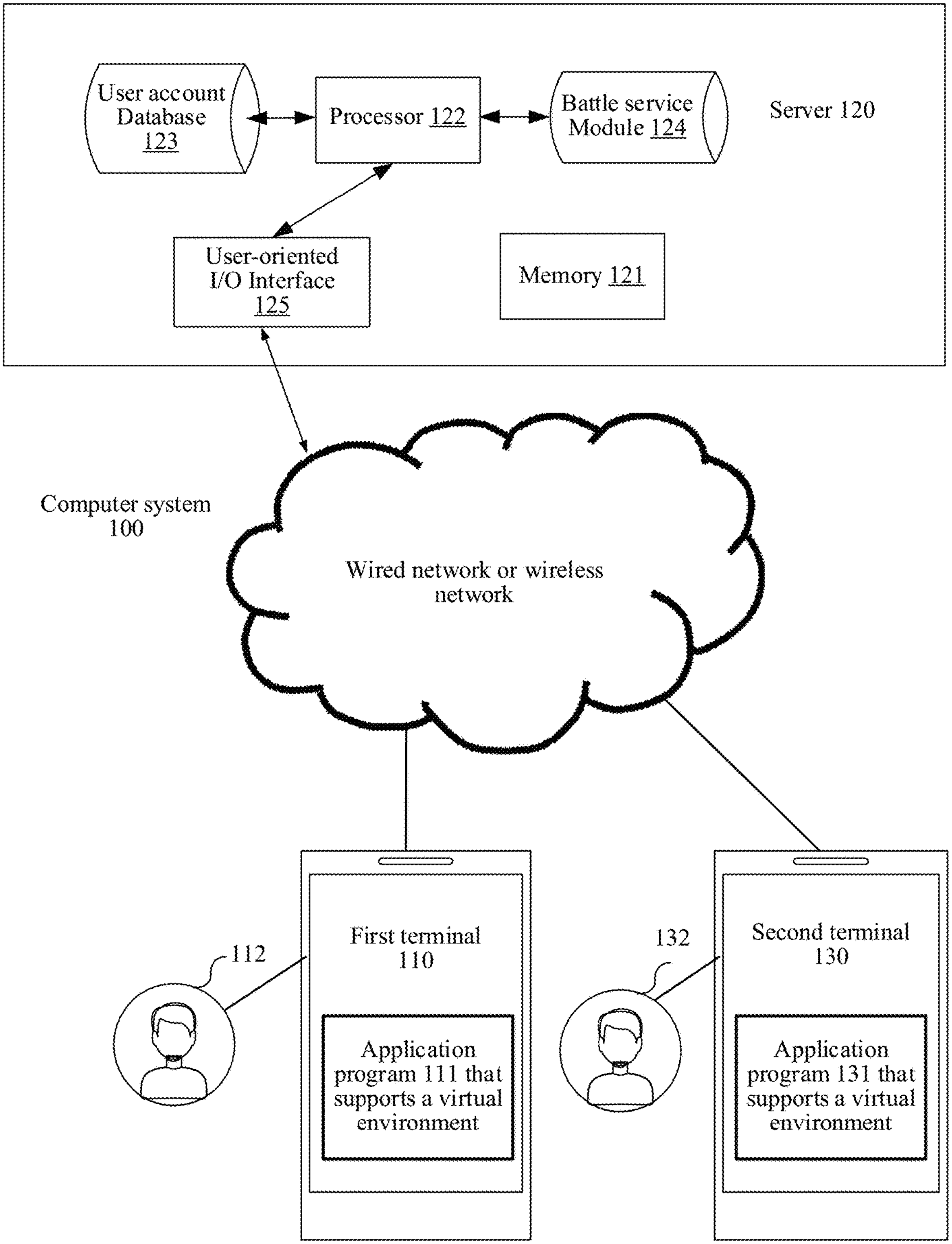
FIG. 1 is a schematic diagram of an implementation environment according to an aspect of this disclosure.

FIG. 1 shows a schematic diagram of an implementation environment according to an aspect of this disclosure. The implementation environment may include: a first terminal 110, a server 120, and a second terminal 130.

An application program 111 that supports a virtual environment is run in the first terminal 110, where the application program 111 may be a multiplayer online battle program. When the first terminal runs the application program 111, a user interface of the application program 111 is displayed on a screen of the first terminal 110. The application program 111 may be any one of a multiplayer online battle arena (MOBA) game or a simulation game (SLG). In this aspect, an example in which the application program 111 is a first-person shooting (FPS) game is used for description. The first terminal 110 is a terminal used by a first user 112, the first user 112 uses the first terminal 110 to control a first virtual object in the virtual environment to perform activities, and the first virtual object may be referred to as a main controlled virtual object of the first user 112. The activities of the first virtual object include but are not limited to at least one of adjusting a body posture, crawling, walking, running, riding, flying, jumping, driving, picking, shooting, attacking, throwing, or casting an ability. For example, the first virtual object is a first virtual character, such as a simulated character or a cartoon character.

An application program 131 that supports a virtual environment is run in the second terminal 130, and the application program 131 may be a multiplayer online battle program. When the second terminal 130 runs the application program 131, a user interface of the application program 131 is displayed on a screen of the second terminal 130. The application program may be any one of a MOBA game or an SLG game. In this aspect, an example in which the application program 131 is an FSP game is used for description. The second terminal 130 is a terminal used by a second user 132, the second user 132 uses the second terminal 130 to control a second virtual object in the virtual environment to perform activities, and the second virtual object may be referred to as a main controlled role of the second user 132. For example, the second virtual object is a second virtual character, such as a simulated character or a cartoon character.

In some aspects, the first virtual object and the second virtual object are in the same virtual world. In some aspects, the first virtual object and the second virtual object may belong to the same camp, the same team, or the same organization, or have a friend relationship, or have a temporary communication permission. In some aspects, the first virtual object and the second virtual object may belong to different camps, different teams, or different organizations, or have a hostile relationship with each other.

In some aspects, application programs installed on the first terminal 110 and the second terminal 130 may be same, or application programs installed on the two terminals are application programs of the same type on different operating system platforms (Android or IOS). The first terminal 110 may generally refer to one of a plurality of terminals, and the second terminal 130 may generally refer to another one of the plurality of terminals. In this aspect, the first terminal 110 and the second terminal 130 are merely used as an example for description. Device types of the first terminal 110 and the second terminal 130 are the same or different. The device type includes at least one of a smartphone, a tablet computer, an e-book reader, a Moving Picture Experts Group Audio Layer III (MP3) player, a Moving Picture Experts Group Audio Layer IV (MP4) player, a laptop computer, or a desktop computer.

Only two terminals are shown in FIG. 1. However, in different aspects, a plurality of other terminals may access the server 120. In some aspects, one or more terminals are terminals corresponding to a developer. By installing a development and editing platform for the application program that supports a virtual environment in the terminal, the developer may edit and update the application program on the terminal, and transmit an updated application program installation package to the server 120 through a wired or wireless network. The first terminal 110 and the second terminal 130 may download the application program installation package from the server 120 to update the application program.

The first terminal 110, the second terminal 130, and another terminal are connected to the server 120 through the wired network or the wireless network.

The server 120 includes at least one of a server, a server cluster including a plurality of servers, a cloud computing platform, or a virtualization center. The server 120 is configured to provide a background service for an application program that supports a three-dimensional virtual environment. In some aspects, the server 120 takes on primary computing work, and the terminal takes on secondary computing work; or the server 120 takes on secondary computing work, and the terminal takes on primary computing work; or collaborative computing is performed by using a distributed computing architecture between the server 120 and the terminal.

For example, the server 120 includes a memory 121, a processor 122, a user account database 123, a battle service module 124, and a user-oriented input/output interface (I/O interface) 125. The processor 122 is configured to load an instruction stored in the server 120 and process data in the user account database 123 and the battle service module 124. The user account database 123 is configured to store data of user accounts used by the first terminal 110, the second terminal 130, and the another terminal, such as avatars of the user accounts, nicknames of the user accounts, combat power indices of the user accounts, and service areas where the user accounts are located. The battle service module 124 is configured to provide a plurality of battle rooms to users for a battle, such as a 1V1 battle, a 3V3 battle, and a 5V5 battle. The user-oriented I/O interface 125 is configured to establish communication with the first terminal 110 and/or the second terminal 130 through the wireless network or the wired network to exchange data.

Figure 2:
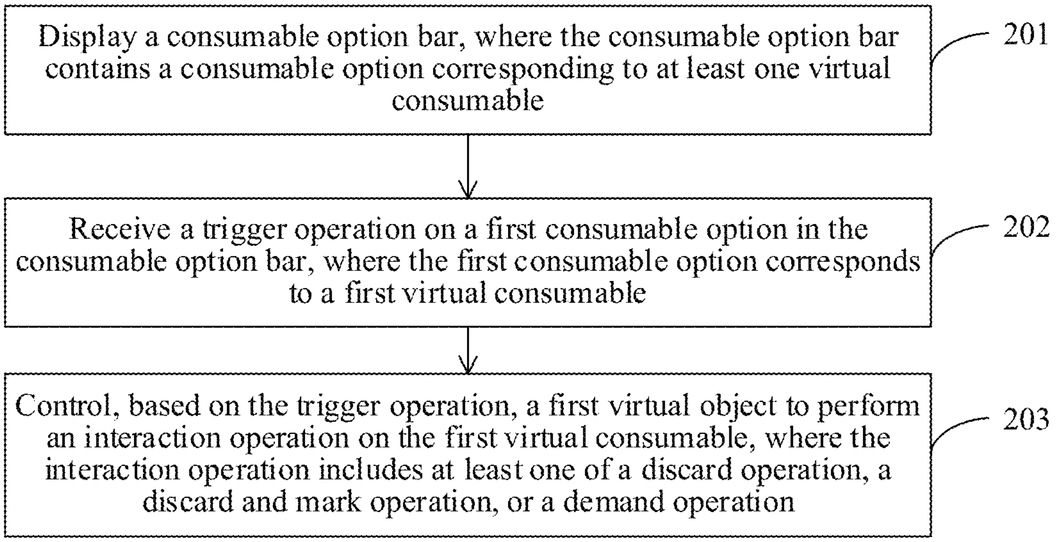
FIG. 2 is a flowchart of a method for demanding and discarding a virtual consumable according to an example aspect of this disclosure.

FIG. 2 shows a flowchart of a method for demanding and discarding a virtual consumable according to an example aspect of this disclosure. In this aspect, an example in which the method is applied to the first terminal 110 or the second terminal 130 in the implementation environment or the another terminal in the implementation environment shown in FIG. 1 is used for description. The method includes the following operations:

Operation 201: Display a consumable option interface, where the consumable option interface contains a consumable option corresponding to at least one virtual consumable.

In some aspects, the virtual consumable is used by a virtual object, or used by a virtual prop possessed by the virtual object. In some aspects, the virtual consumable may be a virtual supply for use by the virtual object, such as a virtual energy supplement drink, a virtual first aid kit, or the like. In some other aspects, the virtual consumable may be a virtual projectile for use by the virtual prop, such as a virtual bullet, a virtual arrow, or the like. A specific type of the virtual consumable is not limited in the aspects of this disclosure.

In some aspects, different from displaying an inventory of all virtual equipments possessed by the virtual object, the consumable option interface is specifically configured for displaying the virtual consumable.

In a possible design, the consumable option interface is independent of the inventory, that is, the consumable option interface can be called out through an operation without calling out the inventory.

The virtual object refers to a main controlled object of a user in a three-dimensional virtual environment. For example, the virtual object may be at least one of a virtual character, a virtual animal, a cartoon character, or a virtual vehicle.

The virtual environment is a three-dimensional environment where the virtual object is located in a virtual world in a running process of the application program in the terminal. In some aspects, in this aspect of this disclosure, the virtual environment is observed through a camera model.

In some aspects, the camera model automatically follows a virtual role in the virtual world, that is, when a position of the virtual object in the virtual world changes, a position of the camera model changes simultaneously along with the position of the virtual object in the virtual world, and the camera model is always within a preset distance range of the virtual object in the virtual world. In some aspects, in an automatic following process, a relative position between the camera model and the virtual object remains unchanged.

The camera model refers to a three-dimensional model located around the virtual object in the virtual world. When a first-person perspective is adopted, the camera model is near a head of the virtual object or located at the head of the virtual object; and when a third-person perspective is adopted, the camera model may be behind the virtual object and bound to the virtual object, or may be located at any position away from the virtual object by a preset distance. Through the camera model, the virtual object in the virtual world may be observed from different perspectives. In some aspects, when the third-person perspective is a first-person over-shoulder perspective, the camera model is behind the virtual object (such as the head and shoulders of the virtual object). In some aspects, in addition to the first-person perspective and the third-person perspective, the perspective further includes other perspectives, such as a top perspective. When the top perspective is adopted, the camera model may be above the head of the virtual object. The top perspective is a perspective for observing the virtual world at an angle from the air. In some aspects, the camera model is not actually displayed in the virtual world. In other words, the virtual world displayed on the user interface does not display the camera model.

In a possible implementation, the terminal displays a consumable option corresponding to at least one virtual consumable possessed by the virtual object in the consumable option interface.

In some aspects, the consumable option is displayed as an icon corresponding to the virtual consumable, and may further include a name and a quantity of the corresponding virtual consumables.

In some aspects, the terminal arranges and displays the consumable option corresponding to the at least one virtual consumable in the consumable option interface according to the quantity of the virtual consumables.

In some aspects, the terminal arranges and displays the consumable option corresponding to the at least one virtual consumable in the consumable option interface according to the name of the virtual consumable.

Figure 3:
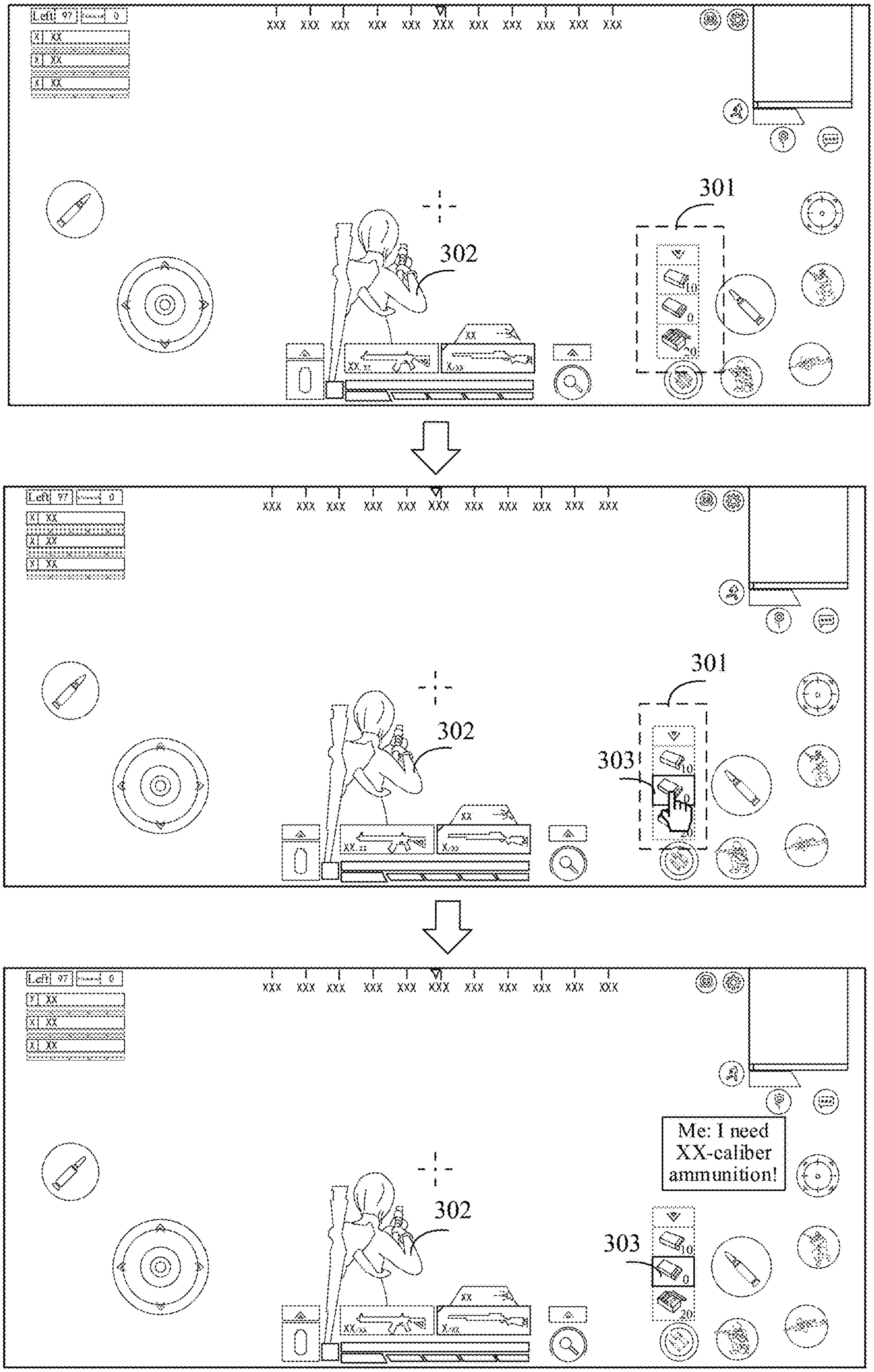
FIG. 3 is a schematic diagram of an interface of receiving a trigger operation on a first consumable option and controlling a first virtual object to perform an interaction operation according to an example aspect of this disclosure.

For example, as shown in FIG. 3, the terminal displays a consumable option interface 301, and at least one virtual consumable displayed in the consumable option interface 301 is consumed by a first virtual object 302 in a process of using the virtual prop.

Operation 202: Receive a trigger operation on a first consumable option in the consumable option interface, where the first consumable option corresponds to a first virtual consumable.

In a possible implementation, the terminal receives the trigger operation by the user on the first consumable option in the consumable option interface, to determine the first consumable option corresponding to the first virtual consumable.

In a possible implementation, in order to distinguish the first consumable option from other consumable options in the consumable option interface, after receiving the trigger operation by the user on the first consumable option in the consumable option interface, the terminal may perform a framing operation on the first consumable option.

For example, as shown in FIG. 3, the terminal receives a trigger operation on a first consumable option 303 in the consumable option interface 301, and performs a framing operation on the first consumable option 303.

Operation 203: Control, based on the trigger operation, a first virtual object to perform an interaction operation on the first virtual consumable, where the interaction operation includes at least one of a discard operation, a discard and mark operation, or a demand operation. As an example, the demand operation is a request operation.

In a possible implementation, based on the received trigger operation on the first consumable option, the terminal controls the first virtual object to perform an interaction operation on the first virtual consumable. Different trigger operations are used for triggering execution of different types of interaction operations.

In some aspects, the different trigger operations may be different types of trigger operations, such as a tap operation, a drag operation, a long press operation, a press operation, and the like; or the different trigger operations may be trigger operations of the same type but with different parameters, such as drag operations with different drag ends, long press operations with different durations, press operations with different strengths, or the like.

In some aspects, the interaction operation includes at least one of the discard operation, the discard and mark operation, and the demand operation, where the discard operation is configured for discarding the first virtual consumable in a virtual environment, the discard and mark operation is configured for discarding the first virtual consumable in the virtual environment and marking a position of the first virtual consumable in the virtual environment, and the demand operation is configured for demanding the first virtual consumable from a second virtual object.

In a possible implementation, a quantity of the first virtual consumables corresponding to the first consumable option in the consumable option interface is greater than zero, and after the terminal controls the first virtual object to perform the discard operation or the discard and mark operation on the first virtual consumable, the quantity of the first virtual consumables corresponding to the first consumable option in the consumable option interface decreases correspondingly.

In some aspects, a process of the terminal controlling the first virtual object to perform the demand operation on the first virtual consumable may be performed by the terminal: After receiving the trigger operation on the first consumable option, the terminal may obtain a name of the first virtual consumable, and correspondingly, send a demand message containing the name of the first virtual consumable to a terminal controlling the second virtual object through a server. For example, the demand message is a request message.

For example, as shown in FIG. 3, the terminal controls the first virtual object 302 to perform the demand operation on the first virtual consumable.

In summary, in the aspects of this disclosure, by using a consumable option interface as an entrance for controlling a first virtual object to perform an interaction operation, a terminal displays a consumable option corresponding to at least one virtual consumable in the consumable option interface, and based on a received trigger operation on a first consumable option in the consumable option interface, controls the first virtual object to perform an interaction operation on a first virtual consumable, where the interaction operation includes at least one of a discard operation, a discard and mark operation, or a demand operation. In this way, the consumable option interface is implemented as a unified entrance to control the first virtual object to perform a plurality of interaction operations on the first virtual consumable, simplifying a path for controlling the first virtual object to perform the interaction operation, and improving the execution efficiency of the interaction operation.

In a possible implementation, since there are a plurality of interaction operations, in order to control the first virtual object to perform a corresponding interaction operation, the terminal may set different trigger operations to correspond to different interaction operations, thereby distinguishingly controlling the first virtual object to perform different interaction operations according to the different trigger operations.

Figure 4:
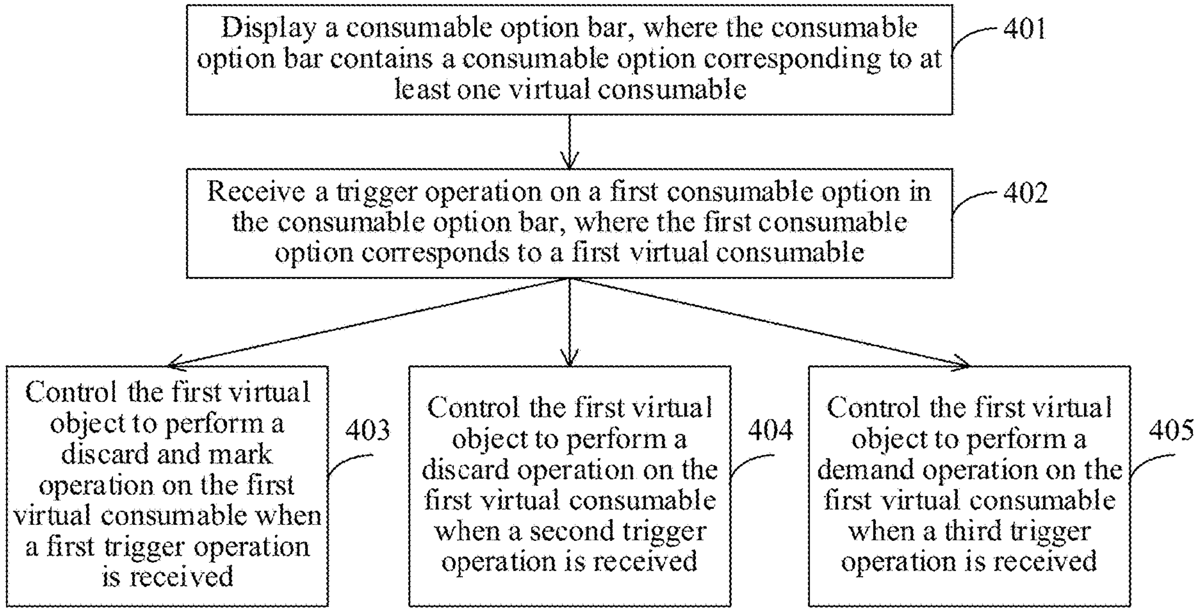
FIG. 4 is a flowchart of a method for demanding and discarding a virtual consumable according to another example aspect of this disclosure.

FIG. 4 shows a flowchart of a method for demanding and discarding a virtual consumable according to an example aspect of this disclosure. In this aspect, an example in which the method is applied to the first terminal 110 or the second terminal 130 in the implementation environment or the another terminal in the implementation environment shown in FIG. 1 is used for description. The method includes the following operations:

Operation 401: Display a consumable option interface, where the consumable option interface contains a consumable option corresponding to at least one virtual consumable.

For a specific implementation of this operation, reference may be made to Operation 201, and details are not described in this aspect again.

Operation 402: Receive a trigger operation on a first consumable option in the consumable option interface, where the first consumable option corresponds to a first virtual consumable.

In a possible implementation, the terminal sets corresponding trigger operations for different interaction operations, which are respectively a first trigger operation corresponding to the discard and mark operation, a second trigger operation corresponding to the discard operation, and a third trigger operation corresponding to the demand operation, and the first trigger operation, the second trigger operation, and the third trigger operation are different from each other.

In some aspects, the first trigger operation, the second trigger operation, and the third trigger operation may be different types of trigger operations, and each of the trigger operations may be a drag operation, a long press operation, a tap operation, or the like.

In some aspects, the first trigger operation, the second trigger operation, and the third trigger operation may be three different forms corresponding to trigger operations of the same type. For example, the first trigger operation, the second trigger operation, and the third trigger operation are respectively a triple-tap operation, a double-tap operation, and a single-tap operation, or a long press operation lasting for one second, a long press operation lasting for three seconds, and a long press operation lasting for five seconds, or the like.

In a possible implementation, the first trigger operation corresponds to the discard and mark operation, the second trigger operation corresponds to the discard operation, and the first trigger operation and the second trigger operation are drag operations with different drag end positions. A process of the terminal receiving the trigger operation on the first consumable option in the consumable option interface may include the following suboperations.

1. Display a first interaction identification region and a second interaction identification region when a drag operation on the first consumable option is received.

When the drag operation by the user on the first consumable option is received, the terminal displays the first interaction identification region and the second interaction identification region, where the first interaction identification region is configured for identifying execution of the discard and mark operation on the first virtual consumable, and the second interaction identification region is configured for identifying execution of the discard operation on the first virtual consumable.

Figure 5:
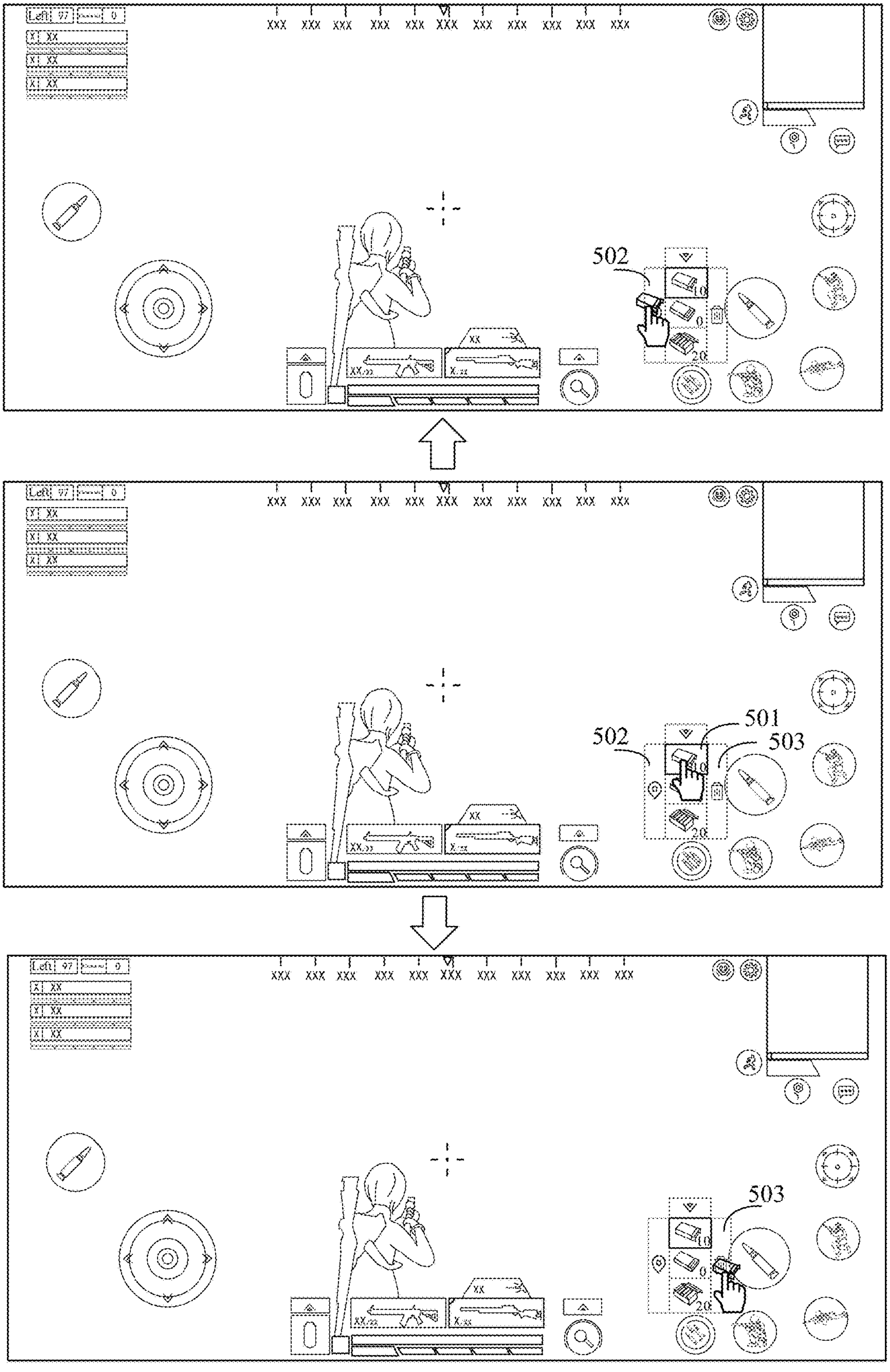
FIG. 5 is a schematic diagram of an interface of a first trigger operation and a second trigger operation being drag operations with different drag end positions according to an example aspect of this disclosure.

For example, as shown in FIG. 5, when a drag operation on a first consumable option 501 is received, the terminal displays a first interaction identification region 502 and a second interaction identification region 503.

In a possible implementation, when a remaining quantity of the first virtual consumables is zero, the first interaction identification region cannot identify execution of the discard and mark operation on the first virtual consumable, and the second interaction identification region cannot identify execution of the discard operation on the first virtual consumable.

In a possible implementation, in order to improve the execution efficiency of the discard and mark operation and the discard operation and reduce unnecessary operations, when the drag operation on the first consumable option is received and a remaining quantity of the first virtual consumables is greater than zero, the terminal displays the first interaction identification region and the second interaction identification region; and when the drag operation on the first consumable option is received and the remaining quantity of the first virtual consumables is zero, the terminal does not display the first interaction identification region and the second interaction identification region.

2. Determine that the first trigger operation is received when a drag end position of the drag operation is located in the first interaction identification region.

The drag end position is a real-time drag position at an end of the drag operation.

In a possible implementation, when the drag end position of the drag operation is located in the first interaction identification region, and the remaining quantity of the first virtual consumables is greater than zero, the terminal determines that the first trigger operation is received.

In some aspects, in a dragging process, when the real-time drag position of the drag operation is located in the first interaction identification region, the terminal may highlight the first interaction identification region, to prompt the user that the first virtual consumable has been dragged to the first interaction identification region.

For example, as shown in FIG. 5, when the drag end position of the drag operation is located in the first interaction identification region 502, the terminal determines that the first trigger operation is received.

3. Determine that the second trigger operation is received when the drag end position of the drag operation is located in the second interaction identification region.

In a possible implementation, when the drag end position of the drag operation is located in the second interaction identification region, and the remaining quantity of the first virtual consumables is greater than zero, the terminal determines that the second trigger operation is received.

In some aspects, in the dragging process, when the real-time drag position of the drag operation is located in the second interaction identification region, the terminal may highlight the second interaction identification region, to prompt the user that the first virtual consumable has been dragged to the second interaction identification region.

For example, as shown in FIG. 5, when the drag end position of the drag operation is located in the second interaction identification region 503, the terminal determines that the second trigger operation is received.

Operation 403: Control a first virtual object to perform a discard and mark operation on the first virtual consumable when a first trigger operation is received.

In a possible implementation, when the first trigger operation is received, the terminal controls the first virtual object to perform the discard and mark operation on the first virtual consumable, that is, the terminal discards the first virtual consumable in a virtual environment and marks a position of the first virtual consumable in the virtual environment.

In some aspects, based on the position of the first virtual consumable in the virtual environment, the terminal can control the first virtual object to mark the position automatically without manually marking by the user, and in response to the discard and mark operation, the terminal can generate a mark message notification corresponding to the first virtual consumable, where the mark message notification may contain a discard quantity of the first virtual consumables, a discard position, a distance between the discard position and a position of another virtual object, and the like. This is not limited in the aspects of this disclosure.

In some aspects, the terminal controls the first virtual object to discard and mark all possessed first virtual consumables, or the terminal controls the first virtual object to discard and mark some of possessed first virtual consumables.

Operation 404: Control the first virtual object to perform a discard operation on the first virtual consumable when a second trigger operation is received.

In a possible implementation, when the second trigger operation is received, the terminal controls the first virtual object to perform the discard operation on the first virtual consumable to discard the first virtual consumable in the virtual environment.

In some aspects, the terminal controls the first virtual object to discard all the possessed first virtual consumables, or the terminal controls the first virtual object to discard some of the possessed first virtual consumables.

Operation 405: Control the first virtual object to perform a demand operation on the first virtual consumable when a third trigger operation is received. In a possible implementation, when the third trigger operation is received, the terminal controls the first virtual object to perform the demand operation on the first virtual consumable, to control the first virtual object to demand the first virtual consumable from the second virtual object.

In a possible implementation, the third trigger operation is a tap operation, and when the tap operation on the first consumable option is received, the terminal determines that the third trigger operation is received.

In some other possible implementations, in order to keep trigger logic of the demand operation, the discard operation, and the discard and mark operation to be consistent, when the drag operation on the first consumable option is received, the terminal further displays a third interaction identification region. When the drag end position of the drag operation is located in the third interaction identification region, the terminal determines that the third trigger operation is received. A specific type of the third trigger operation is not limited in the aspects of this disclosure.

In some aspects, the terminal may further control the first virtual object to send a demand message to the second virtual object, where the demand message may include a demand quantity for the first virtual consumable, current position information of the first virtual object, and the like. This is not limited in the aspects of this disclosure.

In the foregoing aspects, by setting the first trigger operation corresponding to the discard and mark operation, the second trigger operation corresponding to the discard operation, and the third trigger operation corresponding to the demand operation, the first virtual object can be controlled to perform different interaction operations through different trigger operations, thereby avoiding a misoperation between interaction operations, and improving the efficiency of controlling the first virtual object to perform the interaction operation.

In a possible implementation, in order to improve the simplicity of the user interface and avoid a misoperation in a process of controlling the first virtual object, the consumable option interface is not directly displayed in the user interface. In addition, for different interaction operations, in a process of controlling the first virtual object to perform a corresponding interaction operation, specific operation processes are also different.

Figure 6:
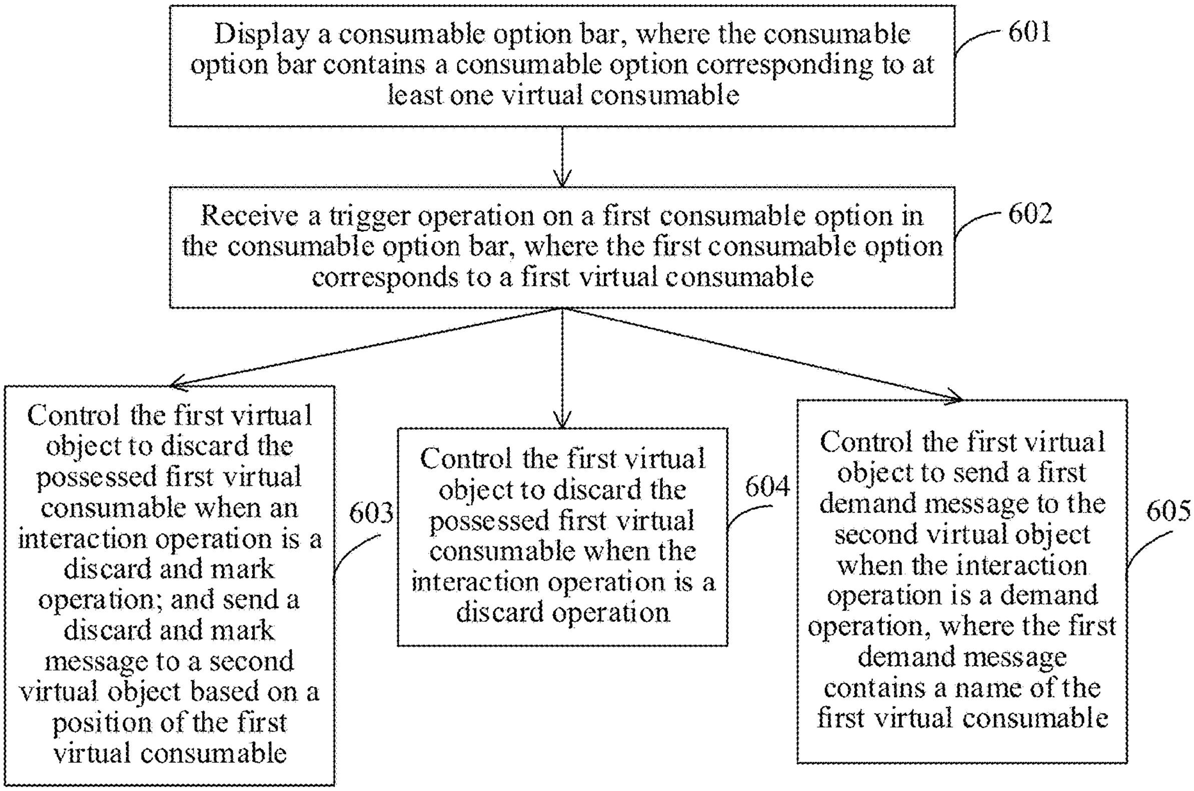
FIG. 6 is a flowchart of a method for demanding and discarding a virtual consumable according to an example aspect of this disclosure.

FIG. 6 shows a flowchart of a method for demanding and discarding a virtual consumable according to an example aspect of this disclosure. In this aspect, an example in which the method is applied to the first terminal 110 or the second terminal 130 in the implementation environment or the another terminal in the implementation environment shown in FIG. 1 is used for description. The method includes the following operations:

Operation 601: Display a consumable option interface, where the consumable option interface contains a consumable option corresponding to at least one virtual consumable. For example, the consumable option interface maybe in different forms, such as bar, drop down, tab or a combination thereof.

In a possible implementation, in order to keep simplicity of controls displayed in the user interface, the consumable option interface is hidden in the user interface in an abbreviated form, and in response to a fourth trigger operation on a consumable filling control, the terminal displays the consumable option interface. In other words, displaying of the consumable option interface is triggered by multiplexing the consumable filling control. For example, the consumable filling control is a consumable loading/reloading control.

The consumable filling control is configured to trigger filling of a virtual consumable into a carried virtual prop, and in response to a fifth trigger operation on the consumable filling control, the terminal fills a virtual consumable for a virtual prop currently carried by the first virtual object. Therefore, in order to distinguish different trigger operations on the consumable filling control, the fourth trigger operation is a trigger operation that is different from the fifth trigger operation.

For example, the fourth trigger operation is a double-tap operation on the consumable filling control, and the fifth trigger operation is a single-tap operation on the consumable filling control. In response to the double-tap operation on the consumable filling control, the terminal displays the consumable option interface, and in response to the single-tap operation on the consumable filling control, the terminal fills the virtual consumable for the virtual prop currently carried by the first virtual object.

In another possible implementation, in order to prevent the user from performing a misoperation on the consumable filling control, the terminal sets a consumable display control associated with the consumable filling control on the user interface, and in response to a sixth trigger operation on the consumable display control, the terminal displays the consumable option interface.

In some aspects, in order to prompt the user that the consumable display control and the consumable filling control are associated, and enable that an operation can be performed on the virtual consumable by triggering the consumable display control, the terminal may display the consumable display control around the consumable filling control.

For example, the sixth trigger operation may be a tap operation on the consumable display control.

Figure 7:
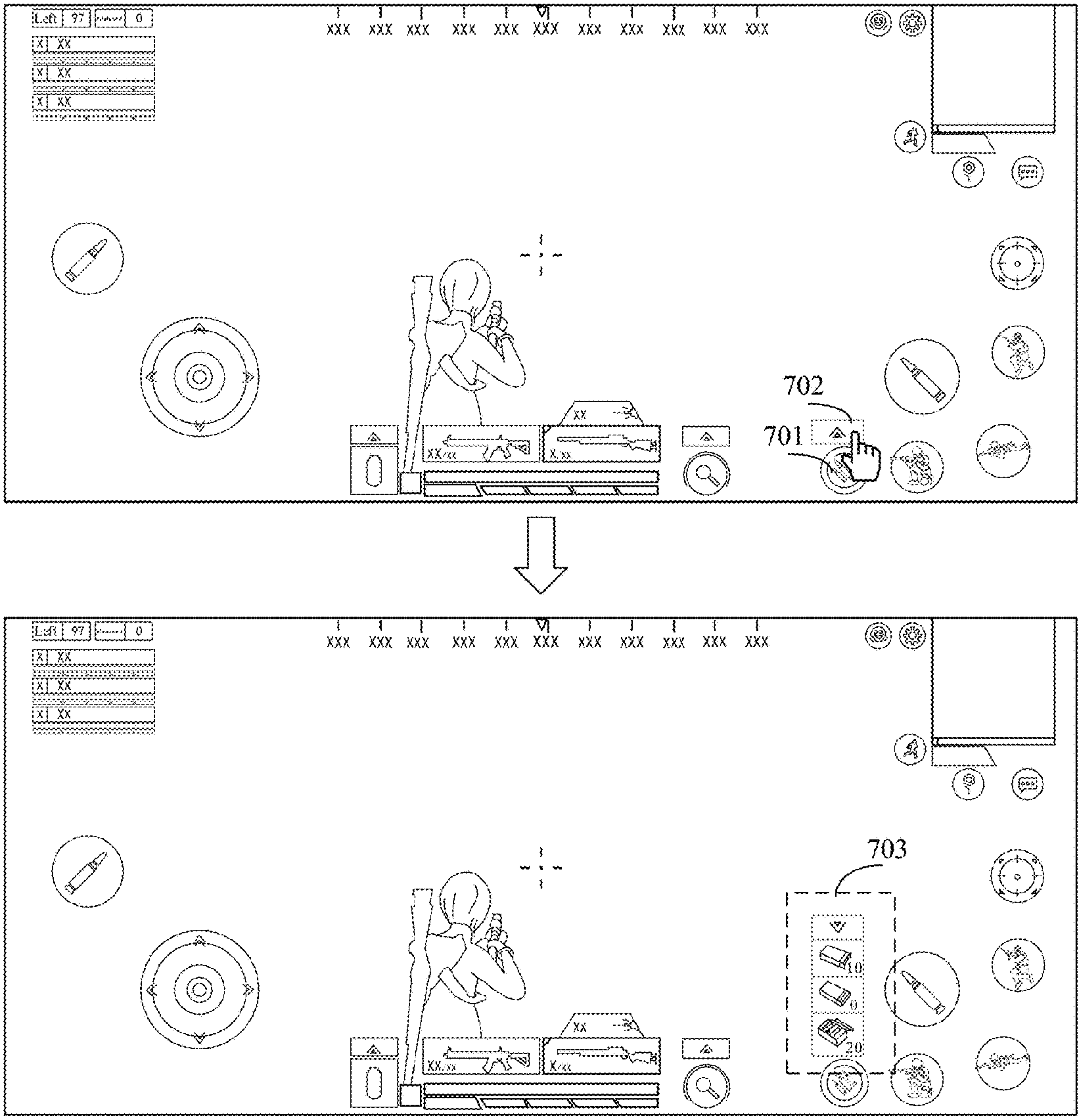
FIG. 7 is a schematic diagram of an interface that displays a consumable option interface according to an example aspect of this disclosure.

For example, as shown in FIG. 7, in response to a tap operation on a consumable display control 702 associated with a consumable filling control 701, the terminal displays a consumable option bar 703.

In a possible implementation, since there are many types of virtual consumables, and different virtual consumables may correspond to different battle scenes, displaying all consumable options in the consumable option bar may cause problems such as too many consumable options and more time consumed for selection by the user. Therefore, the terminal only displays a consumable option corresponding to a second virtual consumable in the consumable option bar, where the second virtual consumable is a virtual consumable consumed by the virtual prop possessed by the first virtual object.

For example, in a virtual battle, virtual props A and B both correspond to a virtual consumable 1, virtual props C and D both correspond to a virtual consumable 2, a virtual prop E corresponds to a virtual consumable 3, and virtual props F and G both correspond to a virtual consumable 4. When the first virtual object possesses the virtual props A and E, consumable options corresponding to the virtual consumables 1 and 3 are displayed in the consumable option bar.

In another possible implementation, in order to satisfy selection and use of the user for the virtual consumable, the terminal displays consumable options corresponding to all types of virtual consumables in the consumable option bar, and in order to improve the efficiency of the user in selecting a consumable option in the consumable option bar, the terminal collectively displays the consumable option corresponding to the second virtual consumable in the consumable option bar.

In some aspects, the terminal may display the consumable option corresponding to the second virtual consumable in a centralized manner in a front half of the consumable option bar, and display consumable options corresponding to other virtual consumables in a rear half of the consumable option bar.

For example, in a virtual battle, virtual props A and B both correspond to a virtual consumable 1, virtual props C and D both correspond to a virtual consumable 2, a virtual prop E corresponds to a virtual consumable 3, and virtual props F and G both correspond to a virtual consumable 4. When the first virtual object possesses the virtual props A and E, consumable options corresponding to the virtual consumables 1 and 3 are displayed in a centralized manner in the front half of the consumable option bar, and consumable options corresponding to the virtual consumables 2 and 4 are displayed in a centralized manner in the rear half of the consumable option bar.

Operation 602: Receive a trigger operation on a first consumable option in the consumable option bar, where the first consumable option corresponds to a first virtual consumable.

For a specific implementation of this operation, reference may be made to Operation 402, and details are not described in this aspect again.

Operation 603: Control the first virtual object to discard a possessed first virtual consumable when an interaction operation is a discard and mark operation; and send a discard and mark message to a second virtual object based on a position of the first virtual consumable.

In a possible implementation, after receiving a first trigger operation on the first consumable option in the consumable option bar, the terminal controls the first virtual object to discard the possessed first virtual consumable, obtains position information corresponding to the first virtual consumable based on the position of the first virtual consumable in the virtual environment, and sends a discard and mark message containing the position information to the second virtual object.

In some aspects, the discard and mark message may include a name of the first virtual consumable, a discard quantity of the first virtual consumables, and the position information of the first virtual consumable in the virtual environment.

Figure 8:
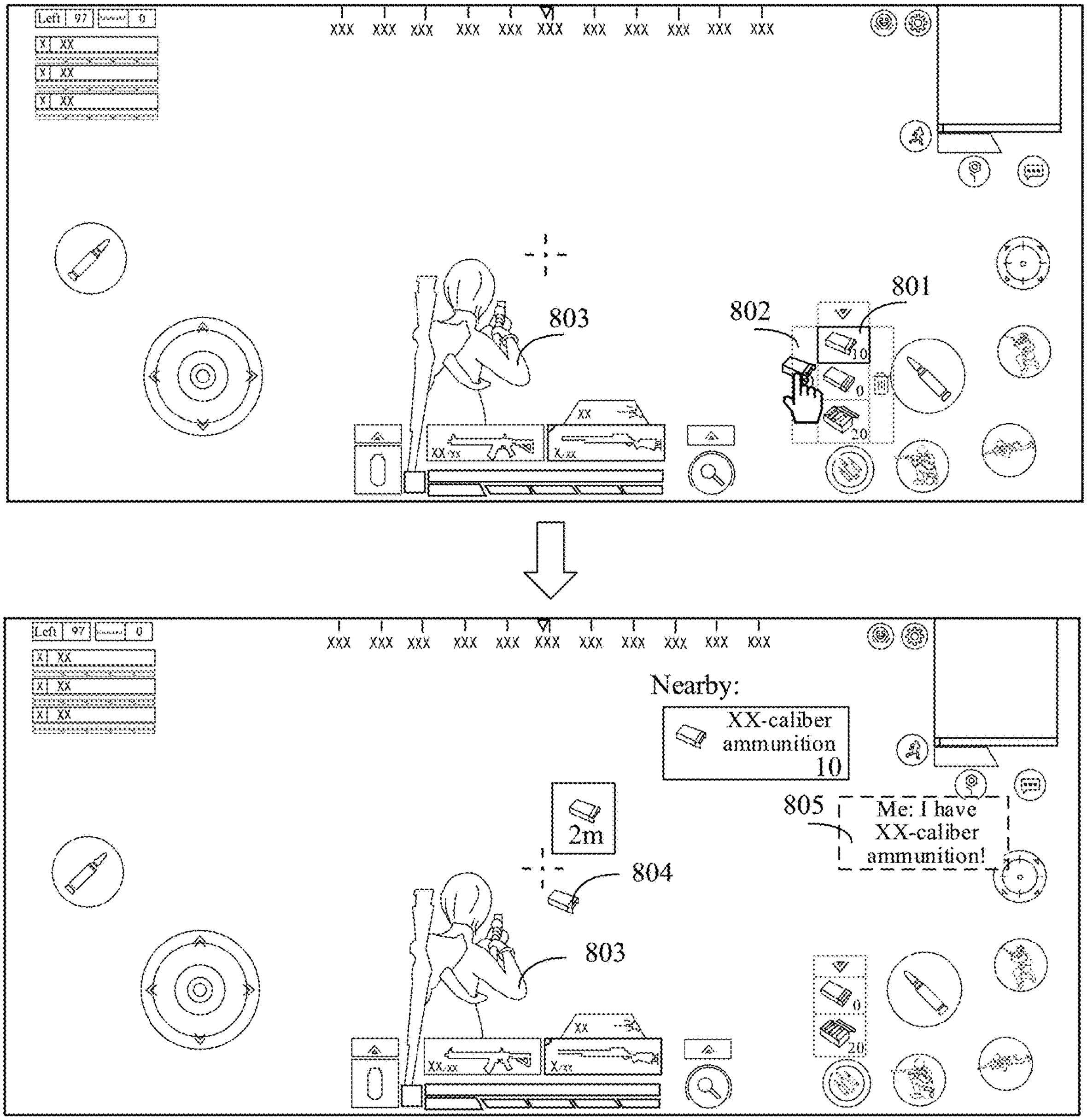
FIG. 8 is a schematic diagram of an interface of controlling a first virtual object to perform a discard and mark operation according to an example aspect of this disclosure.

For example, as shown in FIG. 8, when receiving a drag operation of dragging a first consumable option 801 to a first interaction identification region 802, the terminal controls a first virtual object 803 to discard a first virtual consumable 804, and send a discard and mark message 805 to the second virtual object based on a position of the first virtual consumable 804 in the virtual environment, where the discard and mark message 805 contains position information of the first virtual consumable 804 in the virtual environment and a name of the first virtual consumable 804.

In a possible implementation, in order to improve a speed of the second virtual object looking for the discarded first virtual consumable, the terminal marks and displays the position of the first virtual consumable in the virtual environment in a mini-map.

When discarding and marking the first virtual consumable, in order to avoid discarding a necessary virtual consumable, in some aspects, the terminal may determine a virtual prop possessed by the first virtual object, and based on a virtual consumable consumed by the virtual prop, determine whether a confirmation operation is required when discarding and marking the first virtual consumable.

In a possible implementation, when the first virtual consumable does not belong to the virtual consumable consumed by the virtual prop possessed by the first virtual object (that is, the first virtual consumable does not belong to a target virtual consumable), after receiving the first trigger operation on the first consumable option in the consumable option bar, the terminal controls the first virtual object to discard all possessed first virtual consumables.

In a possible implementation, in order to avoid mistakenly discarding the first virtual consumable, when the first virtual consumable belongs to the virtual consumable consumed by the virtual prop possessed by the first virtual object (that is, when the first virtual consumable belongs to the target virtual consumable), after receiving the first trigger operation on the first consumable option in the consumable option bar, the terminal displays a discard confirmation control and waits for the user to make further confirmation on the discard and mark operation.

In response to a confirmation operation on the discard confirmation control, the terminal controls the first virtual object to discard all possessed first virtual consumables; and in response to a cancel operation on the discard confirmation control, the terminal cancels controlling the first virtual object to discard all the possessed first virtual consumables.

Figure 9:
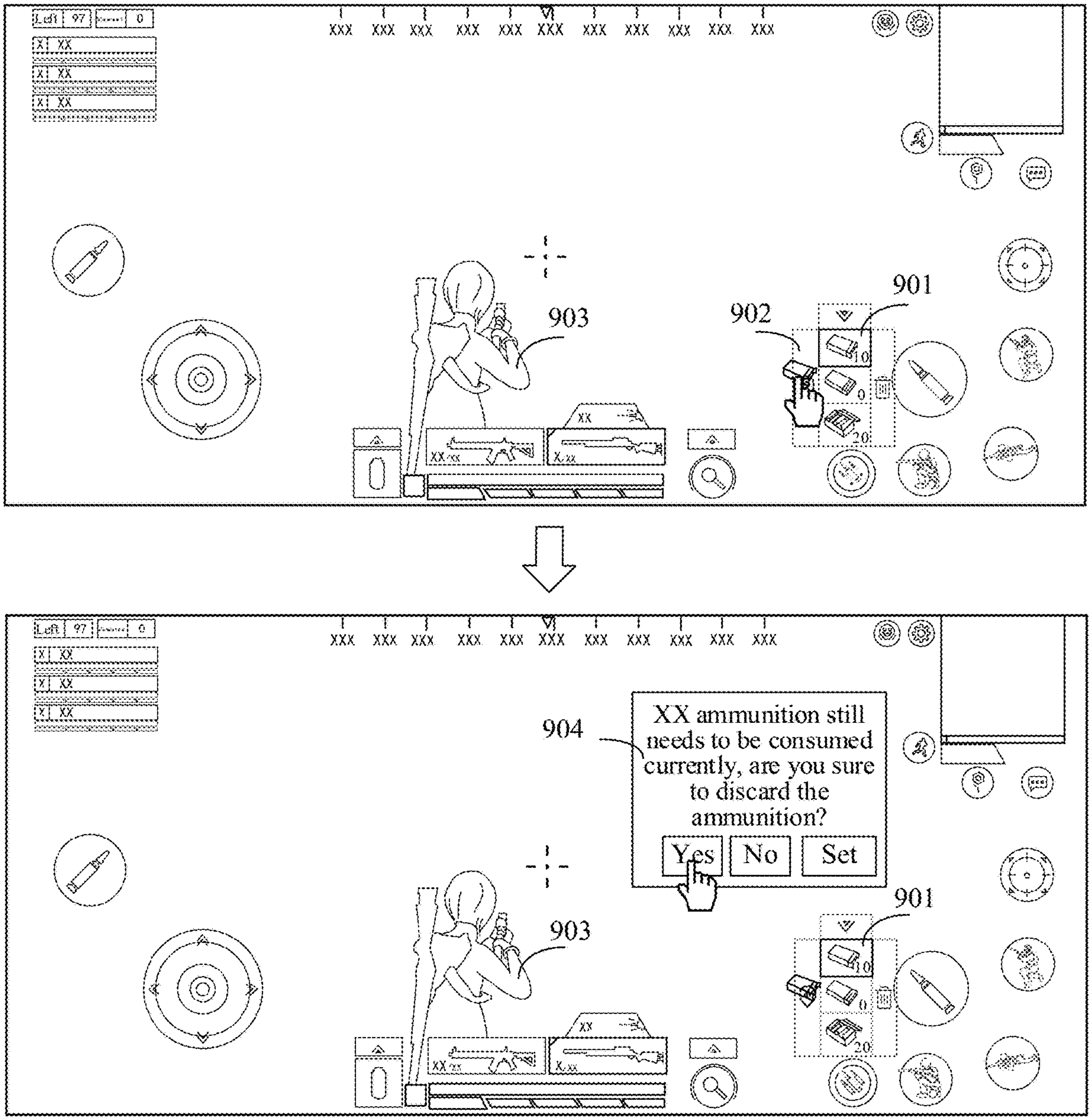
FIG. 9 is a schematic diagram of an interface that displays a discard confirmation control according to an example aspect of this disclosure.

For example, as shown in FIG. 9, a first virtual consumable corresponding to a first consumable option 901 belongs to a virtual consumable consumed by a virtual prop possessed by a first virtual object 903, after receiving a drag operation of dragging the first consumable option 901 to a first interaction identification region 902, and before controlling the first virtual object 903 to perform a discard and mark operation, the terminal displays a discard confirmation control 904, and in response to a confirmation operation by the user on the discard confirmation control 904, the terminal controls the first virtual object 903 to perform the discard and mark operation on the first virtual consumable.

In a possible implementation, in order to prevent the first virtual object from needing the first virtual consumable again after discarding all the first virtual consumables, a discard quantity may be adjusted before the first virtual consumable is discarded.

In some aspects, in response to a set operation on the discard confirmation control, the terminal displays a quantity setting control, where the quantity setting control is configured to set a quantity of discarded first virtual consumables. Based on a set operation on the quantity setting control, the terminal determines a first quantity of discarded first virtual consumables, and controls the first virtual object to discard the first quantity of first virtual consumables.

Figure 10:
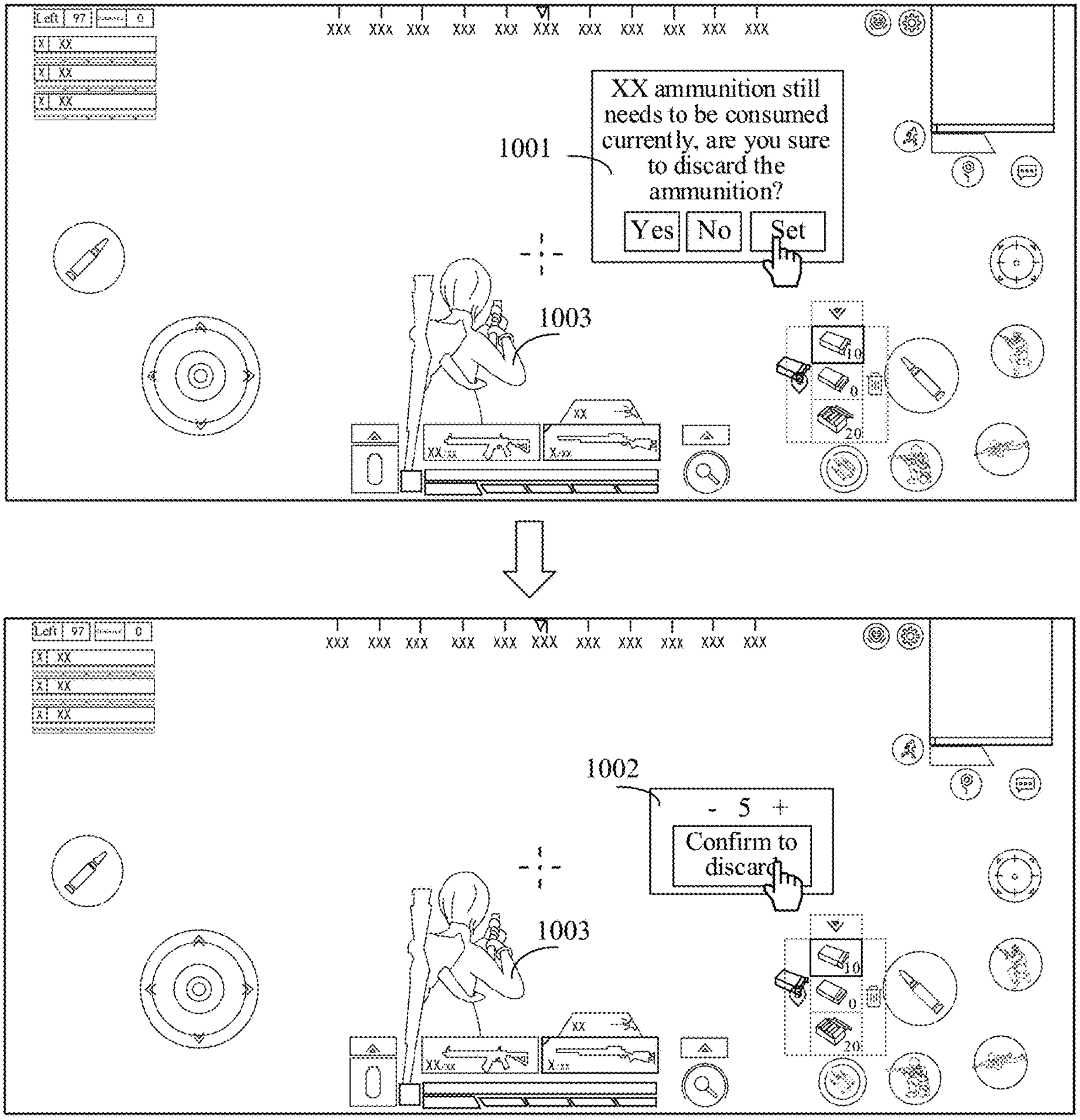
FIG. 10 is a schematic diagram of an interface that displays a quantity setting control according to an example aspect of this disclosure.

For example, as shown in FIG. 10, in response to a set operation (tapping a setting button) by the user on a discard confirmation control 1001, the terminal displays a quantity setting control 1002, and based on a set operation by the user on the quantity setting control 1002, determines that a first quantity of discarded first virtual consumables is 5, to control a first virtual object 1003 to discard and mark 5 first virtual consumables.

Operation 604: Control the first virtual object to discard the possessed first virtual consumable when the interaction operation is a discard operation.

In a possible implementation, when receiving a drag operation of dragging the first consumable option to a second interaction identification region, the terminal controls the first virtual object to discard the possessed first virtual consumable.

Figure 11:
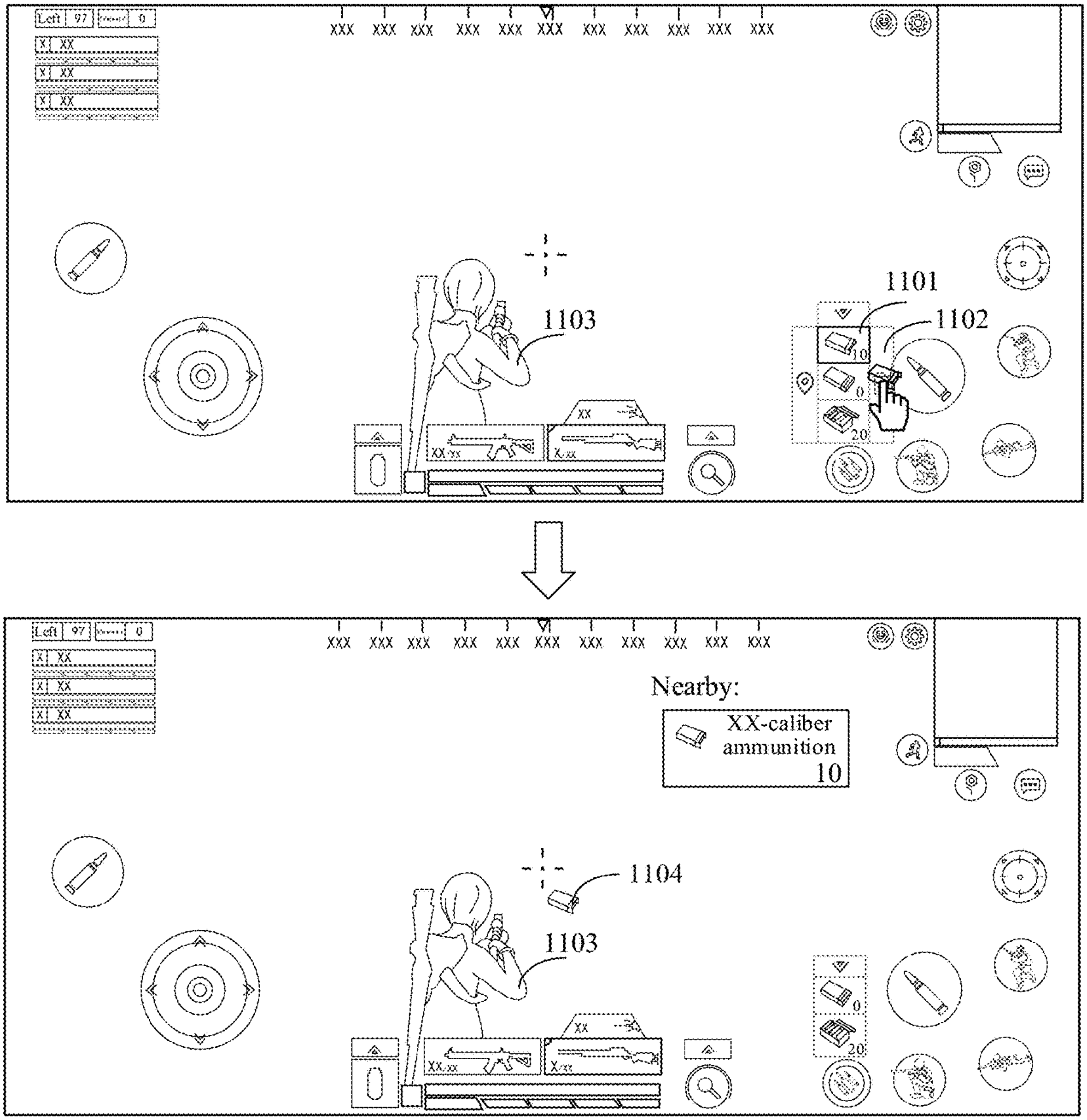
FIG. 11 is a schematic diagram of an interface of controlling a first virtual object to perform a discard operation according to an example aspect of this disclosure.

For example, as shown in FIG. 11, when receiving a drag operation of dragging a first consumable option 1101 to a second interaction identification region 1102, the terminal controls a first virtual object 1103 to discard a possessed first virtual consumable 1104.

In some aspects, in order to avoid mistakenly discarding the first virtual consumable and improve the efficiency of setting the discard quantity of the first virtual consumables, in a process of controlling the first virtual object to perform a discard operation, the terminal may also set a discard confirmation control and a quantity setting control. For a specific implementation of the process, reference may be made to description of controlling the first virtual object to perform the discard and mark operation in Operation 603, which is not described in detail herein again.

Operation 605: Control the first virtual object to send a first demand message to the second virtual object when the interaction operation is a demand operation, where the first demand message contains a name of the first virtual consumable.

In a possible implementation, after receiving the third trigger operation on the first consumable option in the consumable option bar, the terminal controls the first virtual object to send the first demand message to the second virtual object, where the first demand message contains the name of the first virtual consumable.

For example, as shown in FIG. 12, after receiving a tap operation on a first consumable option 1201, the terminal controls a first virtual object 1202 to send a first demand message 1203 to the second virtual object, where the first demand message 1203 contains the name of the first virtual consumable.

In a possible implementation, in order to improve the efficiency of the first virtual object in obtaining the first virtual consumable through demanding, the first demand message may include current position information of the first virtual object.

In the foregoing aspects, through the fourth trigger operation on the consumable filling control or the sixth trigger operation on the consumable display control associated with the consumable filling control, the consumable option bar may be triggered to be displayed in the user interface, which shortens a call-out path of the consumable option bar and reduces a probability of misoperations.

In addition, before controlling the first virtual object to perform the discard and mark operation or the discard operation, by setting the discard confirmation control and the quantity setting control, misoperations in the process of controlling the first virtual object to perform the discard operation or the discard and mark operation are reduced, and the flexibility in setting the discard quantity of the first virtual consumables is improved.

In a possible implementation, in order to further improve the flexibility in setting a quantity of the first virtual consumables in the process of controlling the first virtual object to perform an interaction operation, after receiving the trigger operation on the first consumable option in the consumable option bar, the terminal displays a quantity setting control, and based on setting by the user on the quantity of the first virtual consumables, controls the first virtual object to perform a corresponding interaction operation.

FIG. 13 shows a flowchart of a method for demanding and discarding a virtual consumable according to another example aspect of this disclosure. In this aspect, an example in which the method is applied to the first terminal 110 or the second terminal 130 in the implementation environment or the another terminal in the implementation environment shown in FIG. 1 is used for description. The method includes the following operations:

Operation 1301: Display a consumable option bar, where the consumable option bar contains a consumable option corresponding to at least one virtual consumable.

Operation 1302: Receive a trigger operation on a first consumable option in the consumable option bar, where the first consumable option corresponds to a first virtual consumable.

For specific implementations of Operation 1301 and Operation 1302, reference may be made to Operation 601 and Operation 602. Details are not described in this aspect again.

Operation 1303. Display a quantity setting control, where the quantity setting control is configured to set a quantity of demanded or discarded first virtual consumables.

In a possible implementation, in order to improve the flexibility of the user in setting the quantity of demanded or discarded first virtual consumables, after receiving the trigger operation by the user on the first consumable option in the consumable option bar, and before controlling the first virtual object to perform an interaction operation on the first virtual consumable, the terminal displays the quantity setting control, where the quantity setting control is configured to set an interaction quantity of the first virtual consumables, that is, the quantity of demanded or discarded first virtual consumables.

In some aspects, a quantity initially displayed in the quantity setting control may be 0, or may be a quantity of all first virtual consumables possessed by the first virtual object.

Figure 14:
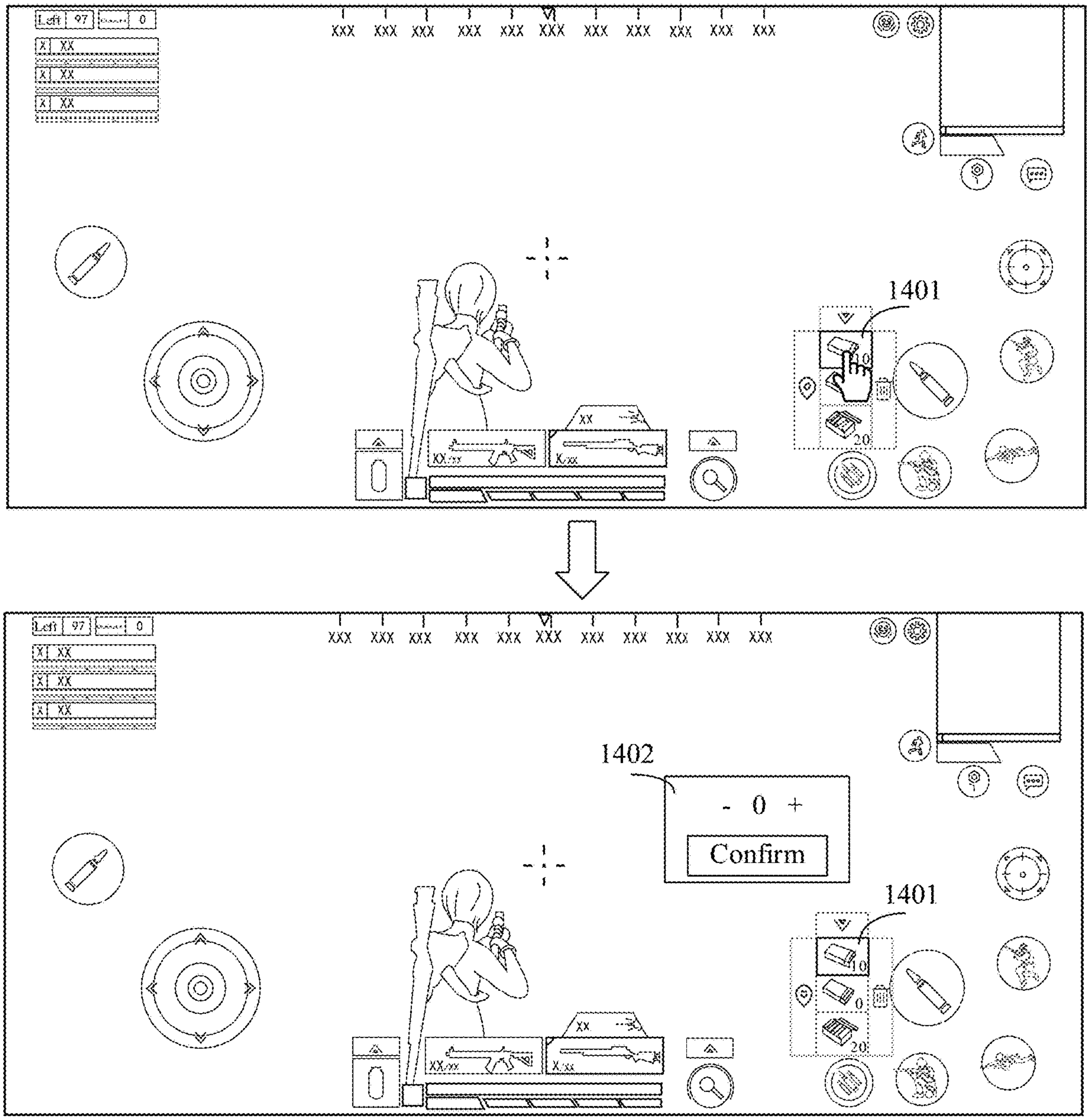
FIG. 14 is a schematic diagram of an interface that displays a quantity setting control according to an example aspect of this disclosure.

For example, as shown in FIG. 14, after receiving a trigger operation by the user on a first consumable option 1401, the terminal displays a quantity setting control 1402.

In a possible implementation, when the interaction operation is a discard and mark operation, when a second demand message for the first virtual consumable is received, the terminal obtains a second quantity contained in the second demand message, where the second demand message is a demand message for the first virtual consumable sent by another virtual object in the same camp.

Further, in order to improve the efficiency of setting the quantity of the first virtual consumables, and to promptly respond to the second demand message sent by the another virtual object in the same camp, based on the second quantity contained in the second demand message and a third quantity of the first virtual consumables possessed by the first virtual object, the terminal displays the quantity setting control.

When the third quantity is greater than or equal to the second quantity, a quantity initially displayed in the quantity setting control may be the second quantity that meets a demand requirement of the another virtual object; and when the third quantity is less than the second quantity, the quantity initially displayed in the quantity setting control may be the third quantity that meets the demand requirement of the another virtual object as much as possible.

For example, 30 seconds before the terminal controls the first virtual object to perform the discard and mark operation on the first virtual consumable, the second virtual object of the same camp sends a demand message for the first virtual consumable, where the demand message indicates that 10 first virtual consumables are required. When the first virtual object possesses 20 first virtual consumables, the terminal displays that the quantity initially displayed in the quantity setting control is 10; and when the first virtual object possesses 5 first virtual consumables, the terminal displays that the quantity initially displayed in the quantity setting control is 5.

In a possible implementation, in order to increase a choice for the user of whether to display the quantity setting control, whether to display the quantity setting control may be determined according to an operation duration corresponding to the trigger operation by the user on the first consumable option in the consumable option bar. When the operation duration of the trigger operation on the first consumable option in the consumable option bar is greater than a duration threshold, the terminal displays the quantity setting control.

When the operation duration of the trigger operation on the first consumable option in the consumable option bar is less than the duration threshold, the terminal does not display the quantity setting control. In some aspects, when the quantity setting control is not displayed, and when the terminal controls the first virtual object to perform a demand operation on the first virtual consumable, a demand quantity for the first virtual consumable is not contained; and when the terminal controls the first virtual object to perform a discard operation or a discard and mark operation on the first virtual consumable, all first virtual consumables are directly discarded.

In a possible implementation, when the interaction operation is the discard and mark operation, based on a drag stay duration of a drag operation on the first consumable option in a first interaction identification region, and when the stay duration is greater than the duration threshold, the terminal displays the quantity setting control.

In a possible implementation, when the interaction operation is the discard operation, based on the drag stay duration of the drag operation on the first consumable option in a second interaction identification region, and when the stay duration is greater than the duration threshold, the terminal displays the quantity setting control.

In a possible implementation, when the interaction operation is the demand operation, based on a stay duration of a tap operation on the first consumable option, and when the stay duration is greater than the duration threshold, the terminal displays the quantity setting control.

For example, the terminal sets the duration threshold to 0.2 seconds. When the interaction operation is the discard and mark operation, and the drag stay duration of the drag operation by the user on the first consumable option in the first interaction identification region is greater than 0.2 seconds, the terminal displays the quantity setting control; and when the interaction operation is the demand operation, and the stay duration of the tap operation by the user on the first consumable option is greater than 0.2 seconds, the terminal displays the quantity setting control.

When the interaction operation is the discard and mark operation, and the drag stay duration of the drag operation by the user on the first consumable option in the first interaction identification region is less than 0.2 seconds, the terminal controls the first virtual object to discard all the first virtual consumables; and when the interaction operation is the demand operation, and the stay duration of the tap operation by the user on the first consumable option is less than 0.2 seconds, the terminal controls the first virtual object to perform a quick demand operation.

Operation 1304: Determine a first quantity based on a set operation on the quantity setting control.

In a possible implementation, based on a set operation by the user on the quantity setting control, the terminal adjusts the interaction quantity of the first virtual consumables, to determine the first quantity.

Figure 15:
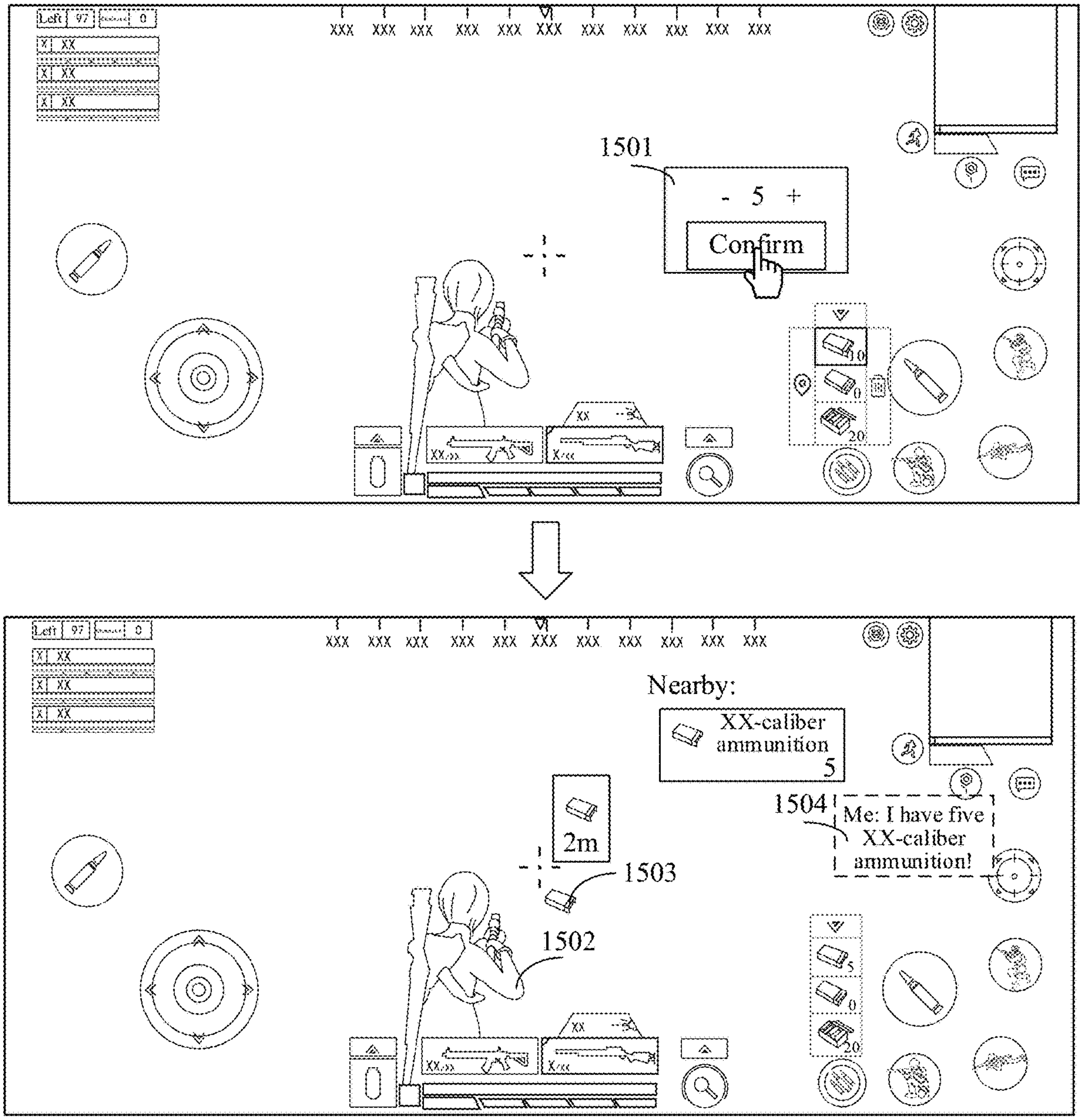
FIG. 15 is a schematic diagram of an interface of controlling a first virtual object to perform a discard and mark operation according to an example aspect of this disclosure.

For example, as shown in FIG. 15, in response to a set operation on a quantity setting control 1501, the terminal determines that the interaction quantity of the first virtual consumables is 5.

Operation 1305: Control a first virtual object to discard the first quantity of first virtual consumables when an interaction operation is a discard and mark operation; and send a discard and mark message to a second virtual object based on a position of the first virtual consumable.

In a possible implementation, in a process of controlling the first virtual object to perform the discard and mark operation on the first virtual consumable, based on the determined first quantity of the first virtual consumables, the terminal controls the first virtual object to discard the first quantity of first virtual consumables, and sends the discard and mark message to the second virtual object based on the position of the first virtual consumable in the virtual environment.

In some aspects, in addition to a name and position information of the first virtual consumable, the discard and mark message may further include a discard quantity of the first virtual consumables.

For example, as shown in FIG. 15, the terminal controls a first virtual object 1502 to discard 5 first virtual consumables 1503, and sends a discard and mark message 1504 to the second virtual object, where the discard and mark message 1504 contains the discard quantity of the first virtual consumables 1503

Operation 1306: Control the first virtual object to discard the first quantity of first virtual consumables when the interaction operation is a discard operation.

Similarly, in a process of controlling the first virtual object to perform the discard operation on the first virtual consumable, based on the determined first quantity of the first virtual consumables, the terminal controls the first virtual object to discard the first quantity of first virtual consumables.

Operation 1307: Control the first virtual object to send a first demand message to the second virtual object when the interaction operation is a demand operation, where the first demand message contains a name and the first quantity of the first virtual consumables.

In a possible implementation, in a process of controlling the first virtual object to perform the demand operation on the first virtual consumable, based on the determined first quantity of the first virtual consumables, the terminal controls the first virtual object to send the first demand message to the second virtual object, where the first demand message contains the name and the first quantity of the first virtual consumables.

Figure 16:
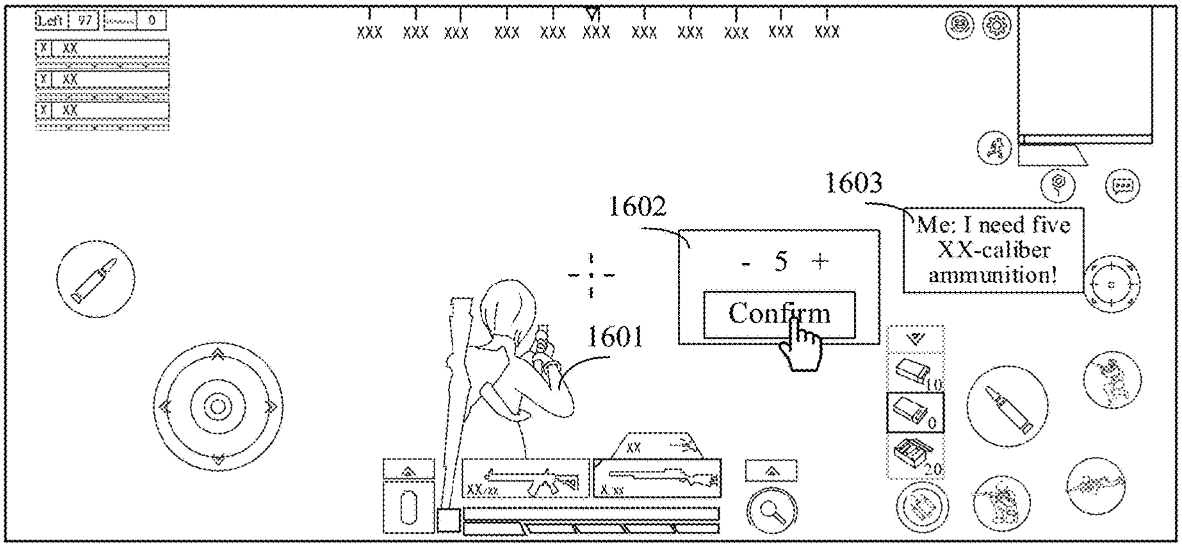
FIG. 16 is a schematic diagram of an interface of controlling a first virtual object to perform a demand operation according to an example aspect of this disclosure.

For example, as shown in FIG. 16, after the user confirms the first quantity "5" in a quantity setting control 1602, the terminal controls a first virtual object 1601 to send a first demand message 1603 to the second virtual object, where the first demand message 1603 indicates that 5 first virtual consumables are required.

In the foregoing aspects, after the trigger operation by the user on the first consumable option in the consumable option bar is received, and before the first virtual object is controlled to perform the interaction operation on the first virtual consumable, displaying of the quantity setting control is added, so that the flexibility of setting the quantity of the first virtual consumables can be improved in a process of controlling the first virtual object to perform the interaction operation.

In addition, in a process of controlling the first virtual object to perform the discard and mark operation based on the second demand message of the second virtual object, the terminal can properly determine the quantity initially displayed when displaying the quantity setting control according to the second quantity contained in the second demand message and the third quantity of the first virtual consumables possessed by the first virtual object, improving the efficiency of setting the discard quantity of the first virtual consumables.

In a possible implementation, when the interaction operation is the discard operation or the discard and mark operation, after controlling the first virtual object to perform the interaction operation on the first virtual consumable, based on a change of the quantity of the first virtual consumables, the terminal needs to update and display the consumable option bar correspondingly. This process may include the following three cases:

1. When a remaining quantity of the first virtual consumables after discarding is greater than zero, the first consumable option in the consumable option bar is updated.

In some aspects, an updating manner of the first consumable option includes at least one of updating a display status, updating display content, or updating a display position. The display status may include display transparency, a display size, a display color, and the like. This is not limited in this aspect.

In a possible implementation, when the remaining quantity of the first virtual consumables after discarding is greater than zero, the terminal updates the first consumable option in the consumable option bar, and when the first consumable option includes the quantity of the first virtual consumables possessed by the first virtual object, updates the quantity of the first virtual consumables in the first consumable option.

In a possible implementation, the terminal sorts consumable options in the consumable option bar according to the quantities of virtual consumables possessed by the first virtual object. When the remaining quantity of the first virtual consumables after discarding is greater than zero, based on the remaining quantity of the first virtual consumables, the terminal sorts and updates the consumable options in the consumable option bar.

2. When the remaining quantity of the first virtual consumables after discarding is equal to zero, and the first virtual object possesses a virtual prop that consumes the first virtual consumable, the first consumable option in the consumable option bar is updated.

In a possible implementation, when the remaining quantity of the first virtual consumables after discarding is equal to zero, and the first virtual object possesses the virtual prop that consumes the first virtual consumable, in order to facilitate a subsequent demand operation by triggering the first consumable option, the terminal continues to display the first consumable option in the consumable option bar. In some aspects, the terminal updates and displays the first consumable option in the consumable option bar, and sets the quantity of the first virtual consumables in the first consumable option to zero.

In a possible implementation, in order to more clearly distinguish from another consumable option of a virtual consumable whose quantity is greater than zero, the terminal displays the first consumable option with increased transparency.

Figure 17:
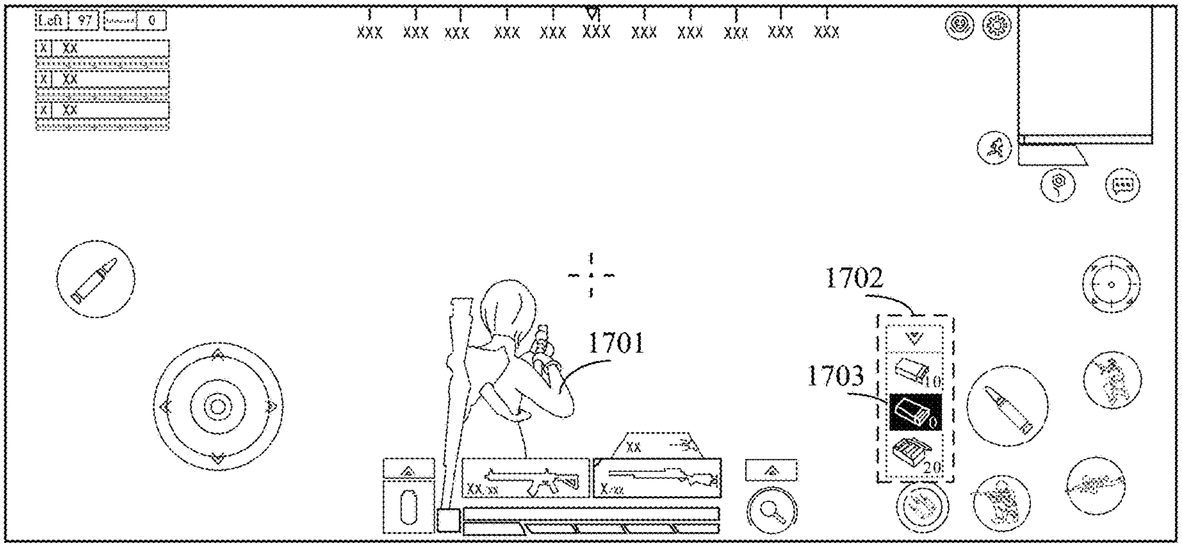
FIG. 17 is a schematic diagram of an interface of updating a consumable option interface according to an example aspect of this disclosure.

For example, as shown in FIG. 17, when the remaining quantity of the first virtual consumables after discarding is equal to zero, and a first virtual object 1701 possesses the virtual prop that consumes the first virtual consumable, the terminal sets the quantity of the first virtual consumables contained in a first consumable option 1703 in a consumable option bar 1702 to zero, and displays the first consumable option 1703 with increased transparency.

3. When the remaining quantity of the first virtual consumables after discarding is equal to zero, and the first virtual object does not possess the virtual prop that consumes the first virtual consumable, the first consumable option is removed from the consumable option bar.

In a possible implementation, when the remaining quantity of the first virtual consumables after discarding is equal to zero, and the first virtual object does not possess the virtual prop that consumes the first virtual consumable, in order to reduce unnecessary display and simplify the consumable option bar, the terminal removes the first consumable option from the consumable option bar.

Figure 18:
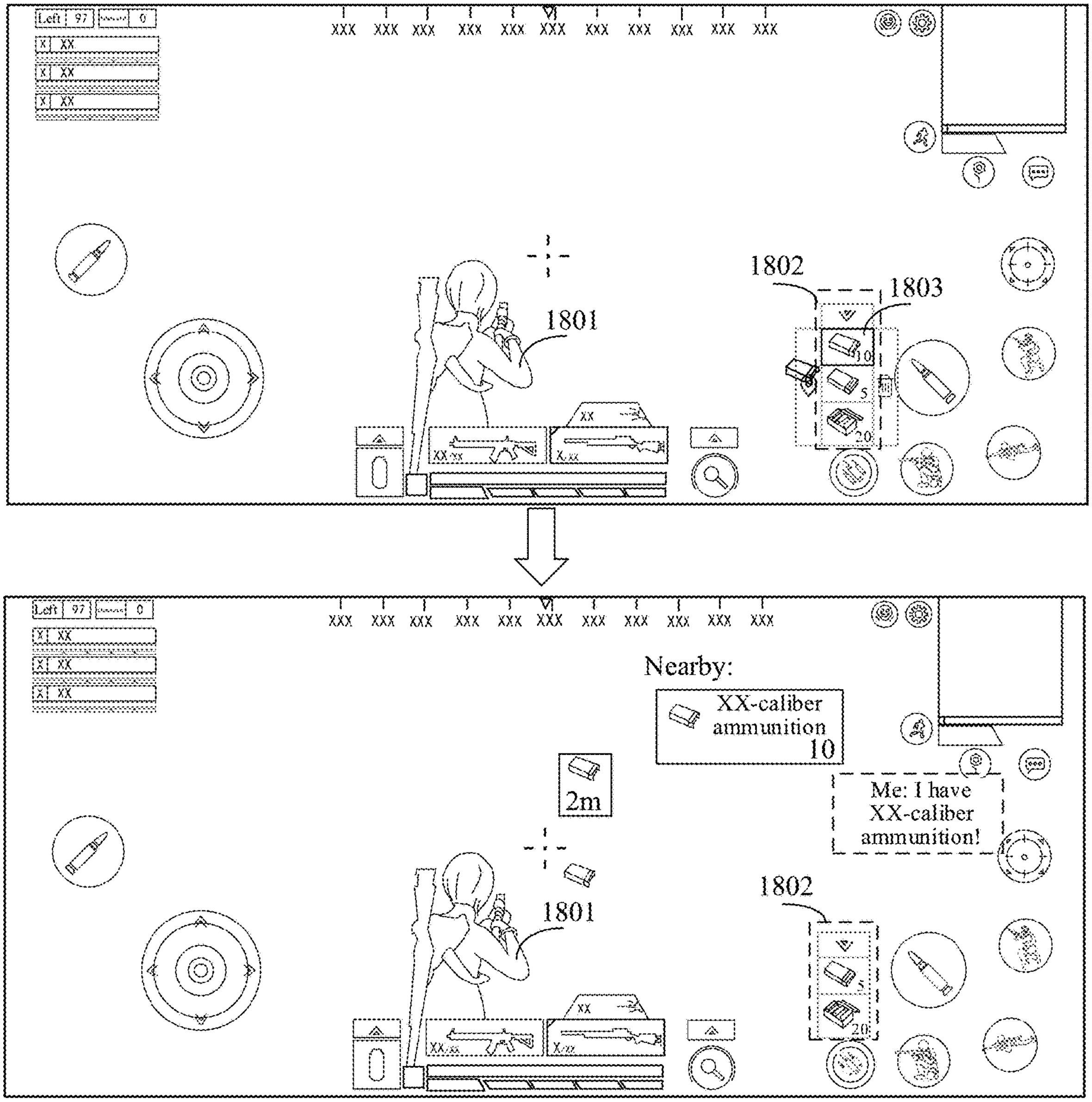
FIG. 18 is a schematic diagram of an interface of removing a first consumable option according to an example aspect of this disclosure.

For example, as shown in FIG. 18, when the remaining quantity of the first virtual consumables after discarding is equal to zero, and a first virtual object 1801 does not possess the virtual prop that consumes the first virtual consumable, the terminal removes a first consumable option 1803 from a consumable option bar 1802.

In the foregoing aspects, after the first virtual object is controlled to perform the discard operation, the consumable option bar is updated and displayed based on the quantity of the first virtual consumables possessed by the first virtual object after discarding, thereby improving a display effect of the consumable option bar, and improving the efficiency of selecting the consumable option based on the consumable option bar.

Figure 19:
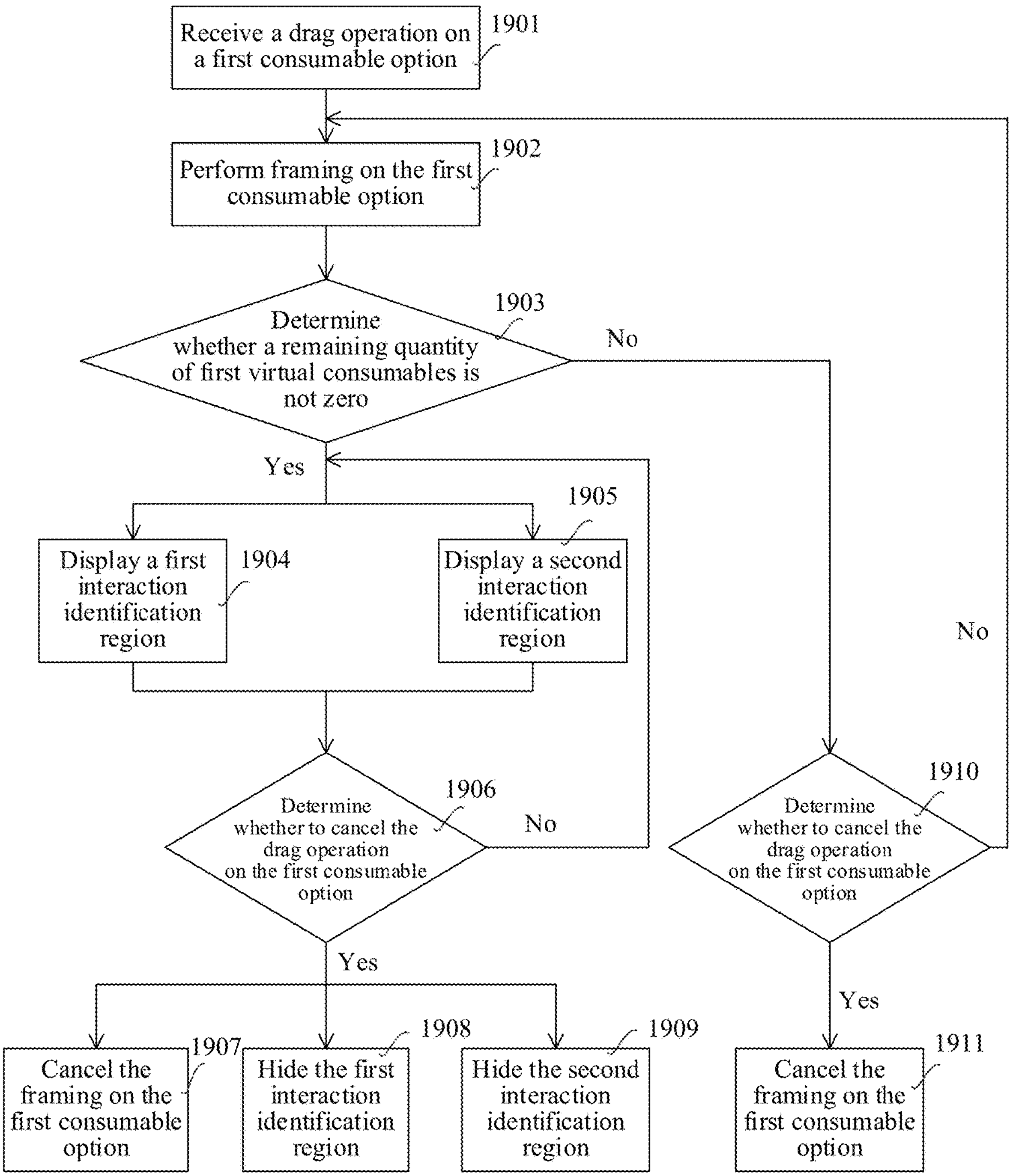
FIG. 19 shows a flowchart of a display process of an interaction identification region according to an example aspect of this disclosure.

FIG. 19 shows a flowchart of a display process of an interaction identification region according to an example aspect of this disclosure.

Operation 1901: Receive a drag operation on a first consumable option.

The terminal receives a drag operation by the user on the first consumable option in the consumable option bar.

Operation 1902: Perform framing on the first consumable option.

In response to the drag operation by the user on the first consumable option, the terminal performs framing on the first consumable option.

Operation 1903: Determine whether a remaining quantity of first virtual consumables is not zero.

When the remaining quantity of the first virtual consumables is zero, Operation 1910 is performed; and when the remaining quantity of the first virtual consumables is not zero, Operation 1904 and Operation 1905 are performed.

Operation 1904: Display a first interaction identification region.

The terminal displays the first interaction identification region, where the first interaction identification region is configured for identifying execution of a discard and mark operation on the first virtual consumable.

Operation 1905: Display a second interaction identification region.

The terminal displays the second interaction identification region, where the second interaction identification region is configured for identifying execution of a discard operation on the first virtual consumable.

Operation 1906: Determine whether to cancel the drag operation on the first consumable option.

When the drag operation on the first consumable option is canceled, Operation 1907, Operation 1908, and Operation 1909 are performed; and when the drag operation on the first consumable option is not canceled, Operation 1904 and Operation 1905 are performed.

Operation 1907: Cancel the framing on the first consumable option.

When the drag operation on the first consumable option is canceled, the terminal cancels the framing on the first consumable option.

Operation 1908: Hide the first interaction identification region.

When the drag operation on the first consumable option is canceled, the terminal hides the first interaction identification region.

Operation 1909: Hide the second interaction identification region.

When the drag operation on the first consumable option is canceled, the terminal hides the second interaction identification region.

Operation 1910: Determine whether to cancel the drag operation on the first consumable option.

When the drag operation on the first consumable option is canceled, Operation 1911 is performed; and when the drag operation on the first consumable option is not canceled, Operation 1902 is performed.

Operation 1911: Cancel the framing on the first consumable option.

When the drag operation on the first consumable option is canceled, the terminal cancels the framing on the first consumable option.

Figure 20:
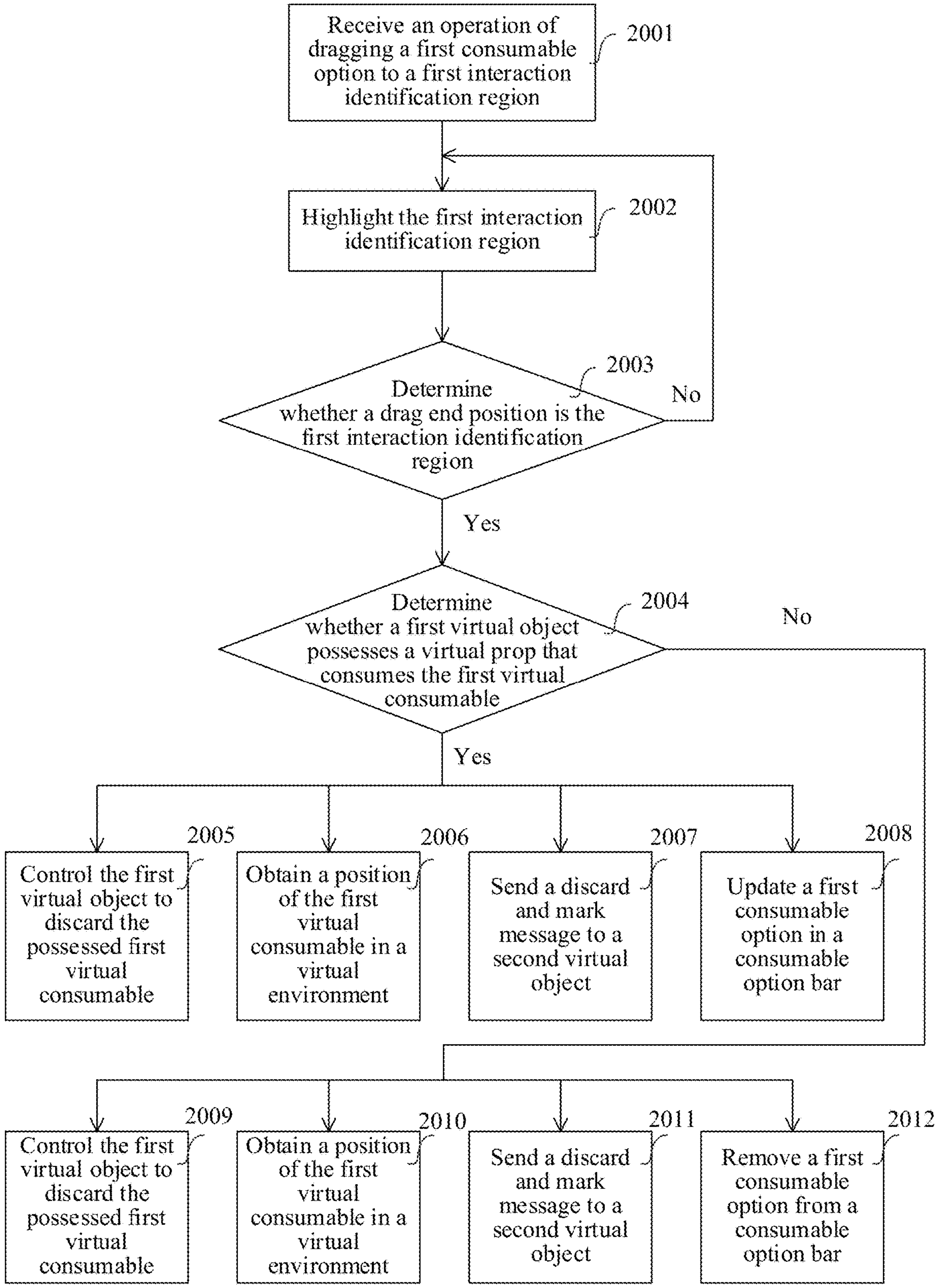
FIG. 20 shows a flowchart of a process of controlling a first virtual object to perform a discard and mark operation according to an example aspect of this disclosure.

FIG. 20 shows a flowchart of a process of controlling a first virtual object to perform a discard and mark operation according to an example aspect of this disclosure.

Operation 2001: Receive an operation of dragging a first consumable option to a first interaction identification region.

The terminal receives an operation by the user of dragging the first consumable option to the first interaction identification region.

Operation 2002: Highlight the first interaction identification region.

In response to the operation of dragging the first consumable option to the first interaction identification region, the terminal highlights the first interaction identification region.

Operation 2003: Determine whether a drag end position is the first interaction identification region.

When the drag end position is the first interaction identification region, Operation 2004 is performed; and when the drag end position is not the first interaction identification region, Operation 2002 is performed.

Operation 2004: Determine whether the first virtual object possesses a virtual prop that consumes a first virtual consumable.

When the first virtual object possesses the virtual prop that consumes the first virtual consumable, Operation 2005 to Operation 2008 are performed; and when the first virtual object does not possess the virtual prop that consumes the first virtual consumable, Operation 2009 to Operation 2012 are performed.

Operation 2005: Control the first virtual object to discard the possessed first virtual consumable.

The terminal controls the first virtual object to discard the possessed first virtual consumable into the virtual environment.

Operation 2006: Obtain a position of the first virtual consumable in a virtual environment.

The terminal obtains the position of the first virtual consumable in the virtual environment.

Operation 2007: Send a discard and mark message to a second virtual object.

Based on position information of the first virtual consumable in the virtual environment and a discard quantity of the first virtual consumables, the terminal controls the first virtual object to send the discard and mark message to the second virtual object.

Operation 2008: Update the first consumable option in a consumable option bar.

The terminal updates and displays the first consumable option in the consumable option bar, sets a quantity of the first virtual consumables in the first consumable option to zero, and displays the first consumable option with increased transparency.

Operation 2009: Control the first virtual object to discard the possessed first virtual consumable.

The terminal controls the first virtual object to discard the possessed first virtual consumable into the virtual environment.

Operation 2010: Obtain a position of the first virtual consumable in a virtual environment.

The terminal obtains the position of the first virtual consumable in the virtual environment.

Operation 2011: Send a discard and mark message to a second virtual object.

Based on position information of the first virtual consumable in the virtual environment and a discard quantity of the first virtual consumables, the terminal controls the first virtual object to send the discard and mark message to the second virtual object.

Operation 2012: Remove the first consumable option from a consumable option bar.

The terminal removes the first consumable option from the consumable option bar, to simplify the consumable option bar.

Figure 21:
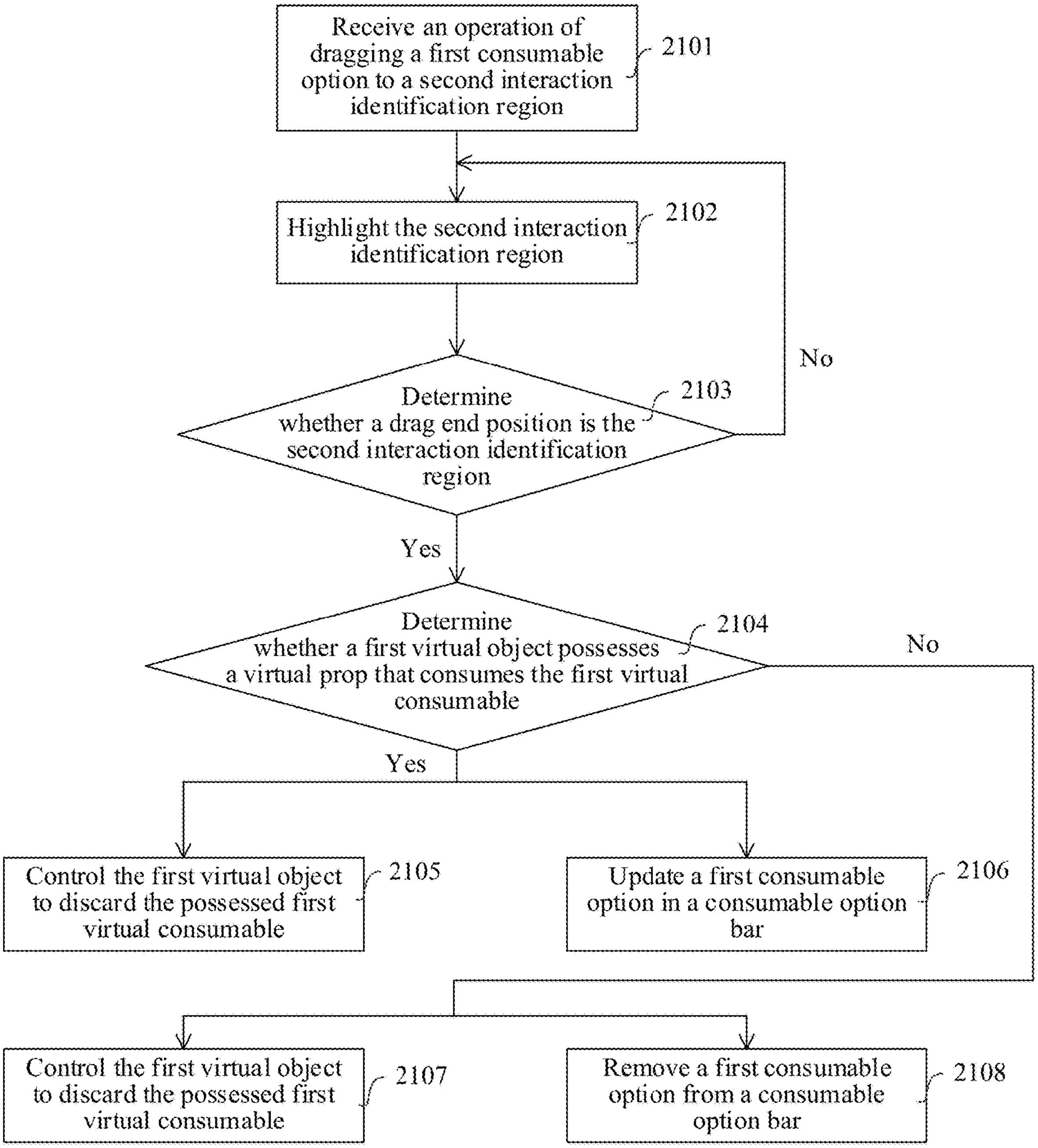
FIG. 21 shows a flowchart of a process of controlling a first virtual object to perform a discard operation according to an example aspect of this disclosure.

FIG. 21 shows a flowchart of a process of controlling a first virtual object to perform a discard operation according to an example aspect of this disclosure.

Operation 2101: Receive an operation of dragging a first consumable option to a second interaction identification region.

The terminal receives an operation by the user of dragging the first consumable option to the second interaction identification region.

Operation 2102: Highlight the second interaction identification region.

In response to the operation of dragging the first consumable option to the second interaction identification region, the terminal highlights the second interaction identification region.

Operation 2103: Determine whether a drag end position is the second interaction identification region.

When the drag end position is the second interaction identification region, Operation 2104 is performed; and when the drag end position is not the second interaction identification region, Operation 2102 is performed.

Operation 2104: Determine whether the first virtual object possesses a virtual prop that consumes a first virtual consumable.

When the first virtual object possesses the virtual prop that consumes the first virtual consumable, Operation 2105 and Operation 2106 are performed; and when the first virtual object does not possess the virtual prop that consumes the first virtual consumable, Operation 2107 and Operation 2108 are performed.

Operation 2105: Control the first virtual object to discard the possessed first virtual consumable.

The terminal controls the first virtual object to discard the possessed first virtual consumable into the virtual environment.

Operation 2106: Update the first consumable option in a consumable option bar.

The terminal updates and displays the first consumable option in the consumable option bar, sets a quantity of the first virtual consumables in the first consumable option to zero, and displays the first consumable option with increased transparency.

Operation 2107: Control the first virtual object to discard the possessed first virtual consumable.

The terminal controls the first virtual object to discard the possessed first virtual consumable into the virtual environment.

Operation 2108: Remove the first consumable option from a consumable option bar.

The terminal removes the first consumable option from the consumable option bar, to simplify the consumable option bar.

Figure 22:
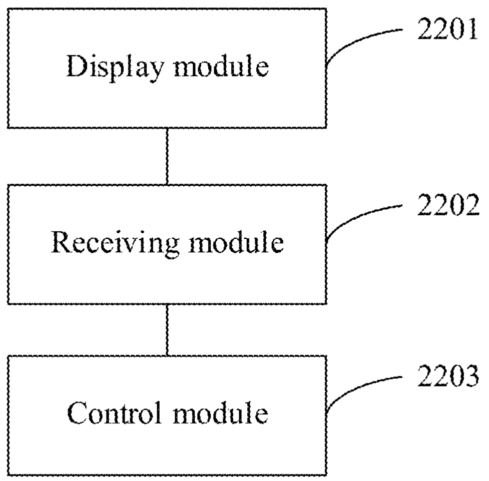
FIG. 22 is a structural block diagram of an apparatus for demanding and discarding a virtual consumable according to an example aspect of this disclosure.

FIG. 22 is a structural block diagram of an apparatus for demanding and discarding a virtual consumable according to an example aspect of this disclosure. The apparatus includes:

a display module 2201, configured to display a consumable option bar, where the consumable option bar contains a consumable option corresponding to at least one virtual consumable;

a receiving module 2202, configured to receive a trigger operation on a first consumable option in the consumable option bar, where the first consumable option corresponds to a first virtual consumable; and a control module 2203, configured to control, based on the trigger operation, a first virtual object to perform an interaction operation on the first virtual consumable, where the interaction operation includes at least one of a discard operation, a discard and mark operation, or a demand operation, where the discard operation is configured for discarding the first virtual consumable in a virtual environment, the discard and mark operation is configured for discarding the first virtual consumable in the virtual environment and marking a position of the first virtual consumable in the virtual environment, and the demand operation is configured for demanding the first virtual consumable from a second virtual object.

In some aspects, the control module 2203 includes:

a first control unit, configured to control the first virtual object to perform the discard and mark operation on the first virtual consumable when a first trigger operation is received; or a second control unit, configured to control the first virtual object to perform the discard operation on the first virtual consumable when a second trigger operation is received; or a third control unit, configured to control the first virtual object to perform the demand operation on the first virtual consumable when a third trigger operation is received, where the first trigger operation, the second trigger operation, and the third trigger operation are different from each other.

In some aspects, the first trigger operation and the second trigger operation are drag operations with different drag end positions.

The receiving module 2202 includes:

a display unit, configured to display a first interaction identification region and a second interaction identification region when a drag operation on the first consumable option is received;

a first receiving unit, configured to determine that the first trigger operation is received when a drag end position of the drag operation is located in the first interaction identification region; and a second receiving unit, configured to determine that the second trigger operation is received when the drag end position of the drag operation is located in the second interaction identification region.

In some aspects, the display unit is configured to:

display the first interaction identification region and the second interaction identification region when the drag operation on the first consumable option is received and a remaining quantity of the first virtual consumables is greater than zero.

In some aspects, the receiving module 2202 includes:

a third receiving unit, configured to determine that the third trigger operation is received when a tap operation on the first consumable option is received.

In some aspects, the first control unit is further configured to: control the first virtual object to discard the possessed first virtual consumable when the interaction operation is the discard and mark operation; and transmit a discard and mark message to the second virtual object based on a position of the first virtual object; or the second control unit is further configured to control the first virtual object to discard the possessed first virtual consumable when the interaction operation is the discard operation; or the third control unit is further configured to control the first virtual object to transmit a first demand message to the second virtual object when the interaction operation is the demand operation, where the first demand message contains a name of the first virtual consumable.

In some aspects, the virtual consumable is consumed during use of a virtual prop; and the first control unit and the second control unit are configured to:

control the first virtual object to discard the possessed first virtual consumable when the first virtual consumable does not belong to a target virtual consumable, where the target virtual consumable is a virtual consumable consumed by a virtual prop possessed by the first virtual object.

In some aspects, the first control unit and the second control unit are further configured to:

display a discard confirmation control when the first virtual consumable belongs to the target virtual consumable, where the target virtual consumable is the virtual consumable consumed by the virtual prop possessed by the first virtual object; and control the first virtual object to discard the possessed first virtual consumable in response to a confirmation operation on the discard confirmation control.

In some aspects, before the control the first virtual object to perform an interaction operation on the first virtual consumable, the apparatus further includes:

a control display module, configured to display a quantity setting control, where the quantity setting control is configured to set an interaction quantity of the first virtual consumables; and a quantity determining module, configured to determine a first quantity based on a set operation on the quantity setting control; and the control module 2203 is configured to:

control the first virtual object to discard the first quantity of first virtual consumables when the interaction operation is the discard and mark operation; and transmit a discard and mark message to the second virtual object based on a position of the first virtual consumable; or control the first virtual object to discard the first quantity of first virtual consumables when the interaction operation is the discard operation; or control the first virtual object to transmit a first demand message to the second virtual object when the interaction operation is the demand operation, where the first demand message contains a name of the first virtual consumable and the first quantity.

In some aspects, the interaction operation is the discard mark operation; and the control display module is configured to:

obtain, when a second demand message for the first virtual consumable is received, a second quantity contained in the second demand message; and display the quantity setting control based on the second quantity and a third quantity of the first virtual consumables possessed by the first virtual object, where when the third quantity is greater than or equal to the second quantity, a quantity initially displayed by the quantity setting control is the second quantity; and when the third quantity is less than the second quantity, the quantity initially displayed by the quantity setting control is the third quantity.

In some aspects, the control display module is configured to:

display the quantity setting control when an operation duration of the trigger operation on the first consumable option in the consumable option bar is greater than a duration threshold.

In some aspects, when the interaction operation is the discard operation or the discard and mark operation, after the control a first virtual object to perform an interaction operation on the first virtual consumable, the apparatus further includes:

an option updating module, configured to update the first consumable option in the consumable option bar when a remaining quantity of the first virtual consumables after discarding is greater than zero;

the option updating module being further configured to update the first consumable option in the consumable option bar when the remaining quantity of the first virtual consumables after discarding is equal to zero and the first virtual object possesses a virtual prop that consumes the first virtual consumable; and an option removing module, configured to remove the first consumable option from the consumable option bar when the remaining quantity of the first virtual consumables after discarding is equal to zero and the first virtual object does not possess the virtual prop that consumes the first virtual consumable.

In some aspects, the display module 2201 is configured to:

display the consumable option bar in response to a fourth trigger operation on a consumable filling control, where the consumable filling control is configured to trigger filling of a virtual consumable into a carried virtual prop, and the fourth trigger operation is different from a fifth trigger operation configured to trigger filling of the virtual consumable;

or display the consumable option bar in response to a sixth trigger operation on a consumable display control associated with a consumable filling control.

In some aspects, the consumable option bar contains a consumable option corresponding to a second virtual consumable, where the second virtual consumable is a virtual consumable consumed by a virtual prop possessed by the first virtual object;

or the consumable option bar contains consumable options corresponding to all types of virtual consumables, and a consumable option corresponding to a second virtual consumable in the consumable option bar is displayed in a centralized manner.

In summary, in some aspects of this disclosure, by using a consumable option bar as an entrance for controlling a first virtual object to perform an interaction operation, while displaying the consumable option bar, the terminal displays a consumable option corresponding to at least one virtual consumable, and based on a received trigger operation on a first consumable option in the consumable option bar, controls the first virtual object to perform an interaction operation on a first virtual consumable, where the interaction operation includes at least one of a discard operation, a discard and mark operation, or a demand operation. In this way, the consumable option bar is implemented as a unified entrance to control the first virtual object to perform a plurality of interaction operations on the first virtual consumable, simplifying a path for controlling the first virtual object to perform the interaction operation, and improving the execution efficiency of the interaction operation.

When the apparatus provided in the foregoing aspects implements the functions of the apparatus, only division of the foregoing functional modules is used as an example for description. During actual application, the foregoing functions may be allocated to and completed by different functional modules according to requirements. In other words, an internal structure of the apparatus is divided into different functional modules, to complete all or part of the functions described above. In addition, the apparatus provided in the foregoing aspects and the method aspects belong to the same concept. For an implementation process of the apparatus, reference may be made to the method aspects. Details are not described herein again.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

Figure 23:
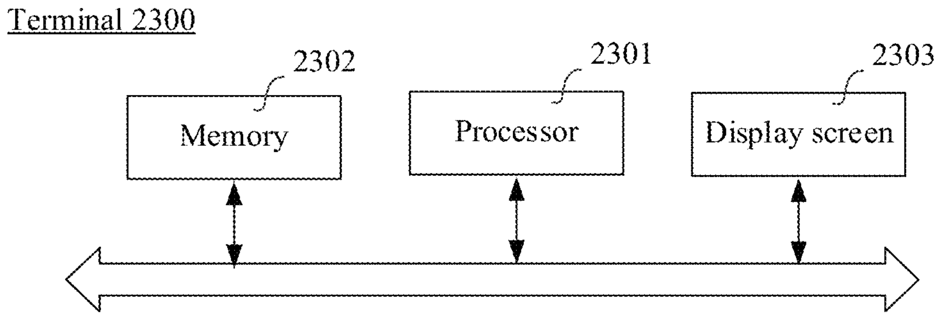
FIG. 23 shows a structural block diagram of a terminal according to an example aspect of this disclosure.

FIG. 23 shows a structural block diagram of a terminal 2300 according to an example aspect of this disclosure. The terminal 2300 may be a portable mobile terminal, such as a smartphone, a tablet computer, an MP3 player, or an MP4 player. The terminal 2300 may also be referred to as another name such as user equipment or a portable terminal.

Usually, the terminal 2300 includes: a processor 2301, a memory 2302, and a display screen 2303.

Processing circuitry, such as the processor 2301 may include one or more processing cores, for example, a 4-core processor or an 8-core processor. The processor 2301 may be implemented in at least one hardware form of a digital signal processor (DSP), a field-programmable gate array (FPGA), or a programmable logic array (PLA). The processor 2301 may also include a main processor and a coprocessor. The main processor is a processor configured to process data in an awake state, and is also referred to as a central processing unit (CPU). The coprocessor is a low power consumption processor configured to process data in a standby state. In some aspects, the processor 2301 may be integrated with a graphics processing unit (GPU). The GPU is configured to render and draw content that needs to be displayed on the display screen. In some aspects, the processor 2301 may further include an artificial intelligence (AI) processor. The AI processor is configured to process computing operations related to machine learning.

The memory 2302 may include one or more computer-readable storage media, such as a non-transitory computer-readable storage medium. The memory 2302 may further include a high-speed random access memory and a non-volatile memory, for example, one or more magnetic disk storage devices or flash storage devices. In some aspects, the non-transitory computer-readable storage medium in the memory 2302 is configured to store at least one instruction, and the at least one instruction is configured to be executed by the processor 2301 to implement the method for demanding and discarding a virtual consumable provided in the aspects of this disclosure.

The display screen 2303 is a component for displaying a picture. In some aspects, the display screen 2303 further has a touch function, and a user may control displayed content by performing a touch operation on the display screen 2303. For example, the display screen 2303 is a touch display screen of a smartphone, or the display screen 2303 is a non-touch display screen of a television terminal.

A person skilled in the art may understand that the structure shown in FIG. 23 constitutes no limitation on the terminal 2300, and the terminal may include more or fewer components than those shown in the figure, or some components may be combined, or a different component deployment may be used.

An aspect of this disclosure further provides a computer-readable storage medium, having at least one program stored therein, where the at least one program is loaded and executed by a processor to implement the method for demanding and discarding a virtual consumable described in the foregoing aspects.

According to an aspect of this disclosure, a computer program product or a computer program is provided, where the computer program product or the computer program includes a computer instruction, and the computer instruction is stored in a computer-readable storage medium. A processor of a terminal reads the computer instruction from the computer-readable storage medium, and the processor executes the computer instruction, so that the terminal performs the method for demanding and discarding a virtual consumable provided in various implementations of the foregoing aspects.

The foregoing descriptions are merely example aspects of this disclosure, but are not intended to limit this disclosure. The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive. Any modification, equivalent replacement, or improvement made within the spirit and principle of this disclosure shall fall within the protection scope of this disclosure.

What is claimed is:

1. A method for requesting or discarding a virtual consumable, the method comprising:

displaying, by processing circuitry, a consumable option interface associated with a first virtual object in a virtual environment;

receiving a first user operation on a first consumable option in the consumable option interface, the first consumable option corresponding to a first virtual consumable;

based on a current quantity of the first virtual consumable possessed by the first virtual object being greater than zero, displaying a first interaction identification region and a second interaction identification region associated with the consumable option interface;

receiving a second user operation on the first consumable option;

based on the second user operation indicating the first interaction identification region, controlling the first virtual object to perform a discard operation that is configured to discard the first virtual consumable in the virtual environment; and based on the second user operation indicating the second interaction identification region, controlling the first virtual object to perform a discard and mark operation that is configured to discard the first virtual consumable in the virtual environment and mark a position of the first virtual consumable in the virtual environment.

2. The method according to claim 1, wherein the first user operation corresponds to a single-tap operation, a double-tap operation, a triple-tap operation, or a long-press operation, and the second user operation corresponds to a drag operation.

3. The method according to claim 1, further comprising:

receiving a third user operation on the first consumable option in the consumable option interface, the third user operation being different from the first user operation; and based on the third user operation on the first consumable option, controlling the first virtual object to perform a request operation that is configured to request the first virtual consumable from a second virtual object.

4. The method according to claim 3, wherein the third user operation corresponds to a tap operation on the first consumable option.

5. The method according to claim 1, wherein the controlling the first virtual object to perform the discard and mark operation further comprises:

transmitting a discard and mark message to a second virtual object based on the position of the first virtual consumable in the virtual environment.

6. The method according to claim 1, wherein the controlling the first virtual object to perform a discard operation comprises:

controlling the first virtual object to discard the first virtual consumable when the first virtual consumable is not consumable by a virtual prop possessed by the first virtual object.

7. The method according to claim 1, wherein the controlling the first virtual object to perform a discard operation comprises:

displaying a discard confirmation, when the first virtual consumable is consumable by a virtual prop possessed by the first virtual object; and controlling the first virtual object to discard the first virtual consumable when a confirmation operation on the discard confirmation is received.

8. The method according to claim 1, further comprising:

displaying a quantity setting control element configured to set an interaction quantity of the first virtual consumable; and determining, based on a set operation on the quantity setting control element, a target quantity of the first virtual consumable to be discarded during the discard operation or the discard and mark operation.

9. The method according to claim 8, wherein the displaying the quantity setting control element comprises:

displaying the quantity setting control element when an operation duration of the first user operation on the first consumable option in the consumable option interface is greater than a duration threshold.

10. The method according to claim 1, further comprising:

when a remaining quantity of the first virtual consumable after the discard operation or the discard and mark operation is greater than zero, updating the first consumable option in the consumable option interface;

when the remaining quantity of the first virtual consumable after the discard operation or the discard and mark operation is equal to zero and the first virtual object possesses a virtual prop by which the first virtual consumable is consumable, updating the first consumable option in the consumable option interface; or when the remaining quantity of the first virtual consumables after the discard operation or the discard and mark operation is equal to zero and the first virtual object does not possess the virtual prop, removing the first consumable option from the consumable option interface.

11. The method according to claim 1, wherein the displaying the consumable option interface further comprises:

receiving a fourth user operation on a consumable loading control element configured to trigger loading of a virtual consumable into a carried virtual prop; and based on the fourth user operation, displaying the consumable option interface.

12. The method according to claim 1, wherein the consumable option interface contains consumable options corresponding to a plurality of virtual consumables, and a second consumable option corresponding to a second virtual consumable in the consumable option interface is displayed in a centralized manner.

13. An apparatus for requesting or discarding a virtual consumable, the apparatus comprising:

processing circuitry configured to:

display a consumable option interface associated with a first virtual object in a virtual environment;

receive a first user operation on a first consumable option in the consumable option interface, the first consumable option corresponding to a first virtual consumable;

based on a current quantity of the first virtual consumable possessed by the first virtual object being greater than zero, display a first interaction identification region and a second interaction identification region associated with the consumable option interface;

receive a second user operation on the first consumable option;

based on the second user operation indicating the first interaction identification region, control the first virtual object to perform a discard operation that is configured to discard the first virtual consumable in the virtual environment; and based on the second user operation indicating the second interaction identification region, control the first virtual object to perform, a discard and mark operation that is configured to discard the first virtual consumable in the virtual environment and mark a position of the first virtual consumable in the virtual environment.

14. The apparatus according to claim 13, wherein the first user operation corresponds to a single-tap operation, a double-tap operation, a triple-tap operation, or a long-press operation, and the second user operation corresponds to a drag operation.

15. The apparatus according to claim 13, wherein the processing circuitry is configured to:

receive a third user operation on the first consumable option in the consumable option interface, the third user operation being different from the first user operation; and based on the third user operation on the first consumable option, control the first virtual object to perform a request operation that is configured to request the first virtual consumable from a second virtual object.

16. The apparatus according to claim 13, wherein the processing circuitry is configured to:

transmit a discard and mark message to a second virtual object based on the position of the first virtual consumable in the virtual environment.

17. A non-transitory computer-readable storage medium, storing instructions which when executed by a processor cause the processor to perform a method for requesting or discarding a virtual consumable, the method comprising:

displaying a consumable option interface associated with a first virtual object in a virtual environment;

receiving a first user operation on a first consumable option in the consumable option interface, the first consumable option corresponding to a first virtual consumable;

based on a current quantity of the first virtual consumable possessed by the first virtual object being greater than zero, displaying a first interaction identification region and a second interaction identification region associated with the consumable option interface;

receiving a second user operation on the first consumable option;

based on the second user operation indicating the first interaction identification region, controlling the first virtual object to perform a discard operation that is configured to discard the first virtual consumable in the virtual environment; and based on the second user operation indicating the second interaction identification region, controlling the first virtual object to perform a discard and mark operation that is configured to discard the first virtual consumable in the virtual environment and mark a position of the first virtual consumable in the virtual environment.

18. The non-transitory computer-readable storage medium according to claim 17, wherein the first user operation corresponds to a single-tap operation, a double-tap operation, a triple-tap operation, or a long-press operation, and the second user operation corresponds to a drag operation.

19. The non-transitory computer-readable storage medium according to claim 17, wherein the method further comprises:

receiving a third user operation on the first consumable option in the consumable option interface, the third user operation being different from the first user operation; and based on the third user operation on the first consumable option, controlling the first virtual object to perform a request operation that is configured to request the first virtual consumable from a second virtual object.

20. The non-transitory computer-readable storage medium according to claim 17, wherein the controlling the first virtual object to perform the discard and mark operation further comprises:

transmitting a discard and mark message to a second virtual object based on the position of the first virtual consumable in the virtual environment.

* * * * *